US009048881B2

(12) United States Patent
Tsai et al.

(10) Patent No.: US 9,048,881 B2
(45) Date of Patent: Jun. 2, 2015

(54) METHOD OF TIME-SYNCHRONIZED DATA TRANSMISSION IN INDUCTION TYPE POWER SUPPLY SYSTEM

(75) Inventors: Ming-Chiu Tsai, New Taipei (TW); Chi-Che Chan, New Taipei (TW)

(73) Assignee: Fu Da Tong Technology Co., Ltd., Zhonghe Dist., New Taipei (TW)

( * ) Notice: Subject to any disclaimer, the term of this patent is extended or adjusted under 35 U.S.C. 154(b) by 521 days.

(21) Appl. No.: 13/488,724

(22) Filed: Jun. 5, 2012

(65) Prior Publication Data

US 2012/0314745 A1 Dec. 13, 2012

Related U.S. Application Data

(63) Continuation-in-part of application No. 13/154,965, filed on Jun. 7, 2011, now Pat. No. 8,810,072.

(30) Foreign Application Priority Data

Mar. 14, 2012 (TW) .............................. 101108610 A

(51) Int. Cl.
*H04B 17/00* (2006.01)
*H04L 7/00* (2006.01)
*H04B 5/00* (2006.01)

(52) U.S. Cl.
CPC ............ *H04B 5/0031* (2013.01); *H04B 5/0037* (2013.01); *H04B 5/0075* (2013.01)

(58) Field of Classification Search
USPC .......... 307/104; 375/219, 220, 222, 224, 286; 713/300, 340, 400, 500, 600
See application file for complete search history.

(56) References Cited

U.S. PATENT DOCUMENTS

| 4,561,443 | A | * | 12/1985 | Hogrefe et al. | 607/31 |
| 5,734,254 | A | | 3/1998 | Stephens | |
| 5,987,244 | A | * | 11/1999 | Kau et al. | 713/500 |
| 6,122,329 | A | | 9/2000 | Zai | |
| 6,154,375 | A | | 11/2000 | Majid | |
| 6,184,651 | B1 | | 2/2001 | Fernandez | |
| 6,345,203 | B1 | | 2/2002 | Mueller | |
| 7,336,929 | B2 | * | 2/2008 | Yasuda et al. | 455/41.2 |
| 7,791,311 | B2 | | 9/2010 | Sagoo | |

(Continued)

FOREIGN PATENT DOCUMENTS

| CN | 101272063 B | 1/2012 |
| CN | 102315692 A | 1/2012 |

(Continued)

*Primary Examiner* — Jared Fureman
*Assistant Examiner* — Carlos Laguerre
(74) *Attorney, Agent, or Firm* — Winston Hsu; Scott Margo

(57) ABSTRACT

The present invention provides a method of time-synchronized data transmission in induction type power supply system, comprising timers and programs installed in a supplying-end module and a receiving-end module to predict the time for generating the trigger signal at the receiving-end end and perform steps for detecting signals to avoid omission. Under the condition of high power transmission, power output on the supplying-end coil is pre-reduced prior to the time expected for receiving trigger data, making the main carrier wave amplitude decrease in a short time period. In every process of data transmission, timers are mutually calibrated and synchronized again to transmit power without detecting and receiving in the period when no data are expected to be transmitted, thus preventing interference of power load noise and enabling the induction type power supply system to transmit data code stably.

9 Claims, 42 Drawing Sheets

(56) References Cited

U.S. PATENT DOCUMENTS

| | | | | |
|---|---|---|---|---|
| 7,847,438 | B2 | 12/2010 | Jin | |
| 8,004,235 | B2 | 8/2011 | Baarman | |
| 8,041,974 | B2 * | 10/2011 | Lin et al. | 713/323 |
| 8,098,043 | B2 | 1/2012 | Lin | |
| 8,183,827 | B2 * | 5/2012 | Lyon | 320/108 |
| 8,188,619 | B2 | 5/2012 | Azancot | |
| 8,217,535 | B2 | 7/2012 | Uchida et al. | |
| 8,217,621 | B2 | 7/2012 | Tsai et al. | |
| 8,248,024 | B2 | 8/2012 | Yuan et al. | |
| 8,358,103 | B2 * | 1/2013 | Eastlack | 320/108 |
| 8,373,387 | B2 | 2/2013 | Bourilkov et al. | |
| 8,412,963 | B2 | 4/2013 | Tsai et al. | |
| 8,417,359 | B2 | 4/2013 | Tsai et al. | |
| 8,541,975 | B2 | 9/2013 | Park et al. | |
| 8,772,979 | B2 | 7/2014 | Tsai | |
| 8,810,072 | B2 | 8/2014 | Tsai | |
| 2006/0017550 | A1 | 1/2006 | Yoshida | |
| 2007/0177533 | A1 | 8/2007 | Palay | |
| 2008/0079392 | A1 | 4/2008 | Baarman | |
| 2008/0231120 | A1 * | 9/2008 | Jin | 307/104 |
| 2009/0009006 | A1 * | 1/2009 | Jin et al. | 307/104 |
| 2009/0033294 | A1 | 2/2009 | Odajima | |
| 2009/0174263 | A1 | 7/2009 | Baarman | |
| 2009/0267561 | A1 | 10/2009 | Lin | |
| 2009/0322280 | A1 * | 12/2009 | Kamijo et al. | 320/108 |
| 2010/0007307 | A1 | 1/2010 | Baarman | |
| 2010/0279606 | A1 | 11/2010 | Hillan | |
| 2011/0065398 | A1 | 3/2011 | Liu et al. | |
| 2011/0136550 | A1 * | 6/2011 | Maugars | 455/573 |
| 2011/0158329 | A1 | 6/2011 | Oettinger | |
| 2011/0159812 | A1 | 6/2011 | Kim | |
| 2011/0176589 | A1 | 7/2011 | Kolof | |
| 2011/0204723 | A1 | 8/2011 | Irish | |
| 2011/0285212 | A1 | 11/2011 | Higuma | |
| 2012/0025622 | A1 | 2/2012 | Kim | |
| 2012/0328061 | A1 * | 12/2012 | Chow | 375/354 |
| 2013/0234532 | A1 | 9/2013 | Fells | |

FOREIGN PATENT DOCUMENTS

| | | |
|---|---|---|
| CN | 102710409 A | 10/2012 |
| CN | 103425169 A | 12/2013 |
| TW | M246884 | 10/2004 |
| TW | 200527302 | 8/2005 |
| TW | 201018042 | 5/2010 |
| TW | 201123673 | 7/2011 |
| TW | 201123676 | 7/2011 |
| TW | 201128972 | 8/2011 |
| TW | 201138258 | 11/2011 |
| TW | 201234871 | 8/2012 |
| TW | 201243281 | 11/2012 |
| TW | 201315082 | 4/2013 |

* cited by examiner

US 9,048,881 B2

METHOD OF TIME-SYNCHRONIZED DATA TRANSMISSION IN INDUCTION TYPE POWER SUPPLY SYSTEM

This application is a Continuation-In-Part of application Ser. No. 13/154,965, filed on Jun. 7, 2011, now pending. The patent application identified above is incorporated here by reference in its entirety to provide continuity of disclosure.

This application claims the priority benefit of Taiwan patent application number 101108610 file on Mar. 14, 2012.

BACKGROUND OF THE INVENTION

1. Field of the Invention

The present invention relates to a method of time-synchronized data transmission in induction type power supply system, particularly to the method of data transmission in power supply system that enables synchronous transmission of power and data signals to prevent mutual interference with noise resistance ability. By using timers installed in microprocessors of a supplying-end module and a receiving-end module and operations of programs, the supplying-end module arranges the time to start detecting trigger signals in advance, adjust power output to make it easy to recognize signals and calibrate and synchronize the timers automatically, and shut off detection to prevent interference with electric load noise when no data is transmitted, thus achieving the function of transmitting data signals stably.

2. Description of the Related Art

In the digital age, digital products are seen everywhere in our life, for example, portable electronic devices such as digital cameras, mobile phones, music players (MP3 and MP4) and etc. These portable electronic devices and products tend to become light, thin, short and small in design. The first requirement for portability is power supply, and the most common solution is to install rechargeable batteries in portable electronic devices, so that these devices can be recharged when electricity runs out. Yet, now everyone has a number of portable electronic devices with a specific charger compatible with each of them. To use a charger for charging a portable electronic device, it is necessary to link the connection interface (plug) of the charger with a receptacle and plug the connector of the charger at the other end into the portable electronic device. While repeated plugging and pulling of connection interfaces easily causes damage to its terminals in the long period, induction type power supply systems can avoid this problem by transmitting power through coil induction without terminal contact.

Usually, functional settings or compilation and transmission of data, etc. shall be conducted for electronic devices in addition to charging. For some electronic devices, settings and input can be conducted directly, but for other electronic devices (e.g. music players (MP3, MP4, etc), digital cameras, electronic watches, portable game machines and consoles), settings cannot be conducted directly and other electronic devices (such as computers, personal digital assistants, etc.) are required to fulfill functional settings and data transmission. Besides, usually charging and data transmission cannot be conducted synchronously and must be carried out separately. Induction type power supply systems (or so-called wireless chargers) currently available in the marketplace rely on two coils to operate: one acting as a supplying-end coil to transmit power and the other acting as a receiving-end coil to receive power. Since wireless power energy can cause dangers and heat up metal objects on the same principle as an induction stove, it is also easy to cause damage or failure of objects that are being charged due to heating effect.

For existing induction type power supply systems, the most important technical problem is the ability to identify objects placed on the supplying-end coil. Like a cooking induction stove, induction power can transmit enormous energy of electromagnetic waves, which may heat up metal objects and cause dangers if directed towards these objects. To solve this problem, some firms try to develop technologies of identifying objects, and after putting efforts for several years, find that the best solution that depends on a receiving-end coil of a receiving-end module to transmit feedback signals and on a supplying-end coil to receive signals. The most important core technology is to achieve the function of transmitting data through the induction coils. It is difficult to transmit data stably through induction coils for supplying power, because main carrier waves are transmitted by high-power electricity and may be affected by interferences occurring during use of power systems. Moreover, since it also constitutes a frequency-changer control system, the operating frequency of carriers will not be fixed; furthermore, when the induction coil is used to supply power, a wireless communication channel (such as infrared, Bluetooth, radio frequency identification (RFID) or WiFi communication channel, etc) is established separately. However, adding wireless communication devices into the existing induction type power supply system will lead to increase of manufacturing cost for the system.

When induction type power coils are used to transmit data, one problem that should be noticed is how to transmit and receive data synchronously. Like the method of transmitting data over RFID, the method of transmitting data over supplying-end coil is operated in the way that the supplying-end coil transmits the main carrier to the receiving-end coil and the receiving-end circuit feeds back by controlling load changes. In existing design of induction type power supply systems, power energy and data are transmitted in unidirectional way, i.e. the power energy (LC main oscillating carrier transmitted from the supplying-end coil) is transmitted from the supplying-end module to the receiving-end module, while the data code is fed from the receiving-end module to the supplying-end module. But the receiving-end module only receives energy that is either strong or weak from the supplying-end module without emitting data signals of communication actively, and can feed back only after getting close to the supplying-end module and receiving power. And the supplying-end module cannot transmit data codes if not supplying power energy, so there are still considerable limitations and inconveniences in use of the induction type power supply system.

Refer to FIGS. 30 and 31, which illustrate the structures of receiving power and data feedback of the receiving-end module. As shown in these figures, there are two types of structural design for this purpose: resistance type and capacitance type. The resistance type modulation of feedback signals originates from the passive RFID technology, which relies on resistance of the receiving-end coil to switch feedback signals to the supplying-end coil for reading, as applied in a wireless charging system disclosed in US Patent Publication No. 20110273138, entitled Wireless Charging System (Taiwan Patent Publication No. 201018042, entitled Wireless Charging System) filed by Access Business Group (Fulton). According to this invention, the load resistor of the switch placed on the rear side of the receiving rectifier, or Rcm in FIG. 31, is used to make changes in impedance characteristics on the receiving-end coil that is fed back to the supplying-end coil. These changes will be analyzed by the detection circuit on the supplying-end coil, and then decoded by the software installed in the processor of the supplying-end module.

Referring to FIGS. 32 and 33, FIG. 32 illustrates the signal status on the supplying-end coil. When the Rcm switch is closed, it will cause the impedance on the receiving-end coil to drop down, making the amplitude on the supplying-end coil increase after feeding back to the supplying-end coil. Then the asynchronous serial format in UART communication mode is used for encoding, i.e. to interpreting logic data codes by determining whether the modulation status changes at this time point in a fixed time cycle. However, this way of encoding may result in a problem that modulation load is kept switching on within a cycle time.

Refer to FIGS. 34 and 35, which illustrate the data transmission format in qi specifications. These figures show a data transmission frequency modulated and demodulated with the 2 KHz timing frequency. It can be worked out that the longest duration of modulation load conduction is a cycle in a signal feedback. In UART communication mode, the duration of modulation load conduction does not affect system functions. In induction type power supply system, however, the state of modulation load conduction will affect the state of power supply, because the main carrier at the supplying-end is used to supply power and can transmit strong current drive force due to the coupling effect of the supplying-end module and receiving-end module. But the resistor load at the receiving-end module needs to withstand feedback drive currents; when power increases, the power to be withstood at Rcm will increase, too. Besides, in the process of modulation, the electric currents that originally go to the receiving-end module for output will be shunted by Rcm, thus reducing the output capability at the receiving-end module. Moreover, signals are easy to recognize only when the cycle time for signal modulation is far less than that of transmission frequency. As main carrier waves in induction type power supply system can only operate at a lower frequency (roughly 100~200 KHz) as a result of components' performance restraints or in accordance with laws and regulations electromagnetic interference, while data transmission depends on modulation of main carrier waves, the data transmission frequency must be far lower than the main carrier wave frequency to ensure smooth operation. Due to the conflict of the above conditions, when the power of induction type power supply system is increased, data modulation with resistor loads will not work any more.

Since signal modulation loads need to absorb considerably large electric currents and it leads to the problem of power loss following power increases, making it impossible to use this method, some firms propose a new method of capacitive signal modulation. In US Patent Publication No. 20110065398, entitled Universal Demodulation And Modulation For Data Communication In Wireless Power Transfer by Hongkong-based Convenient Power HK Ltd (referring to FIGS. 36 and 37), capacitors and switches are added at the receiving-end module to feed signals to the supplying-end module and generate changes in the voltage, current and input on the supplying-end coil, and data signals are identified through analysis of these three variables of signals. The shortcoming of this method lies in that all three variables are so weak that several amplification circuits are needed for analysis, making the circuit cost increase significantly.

As shown in FIGS. 38, 39, 40, 41 and 42, coil amplitudes or coil output power will increase during signal modulation to enable the analysis circuit to identify the amount of variance and transmit it to the microprocessor for analysis. In the figure of analysis amplification, when the amplitude of the induction type power supply system reaches Point A, it will increase to Point B following signal modulation, and may increase to Point C or D if the modulation energy increases (low resistance is used at Rcm in the previous example). In the induction type power supply system, the amplitude changes with the load state at the receiving-end module. Under the condition of high power output, the amplitude may operate at Point C or D, and may move to Point E if signals are modulated under such circumstance. This can be seen as an overload reaction, and at this time, the power supply system will lose the capability to increase amplitudes through signal modulation to transmit data, which may lead to the system failure. In light of this limitation, the induction type power supply system is designed to make its amplitude reach a lower position of Point A or B with low power output. When the output power is increased, the amplitude needs to be increased to Point C or D, resulting in system failure.

Therefore, to solve this problem, all firms that engage in this field focus on how to increase the power for the induction type power supply system

SUMMARY OF THE INVENTION

In view of the aforesaid problems and disadvantages, the inventor has collected related information, conducted assessments and taken considerations in many aspects, and based on many years of his own experience in this field, finally invented the method of time-synchronized data transmission in induction type power supply system that allows electronic products to transmit power and data signals synchronously, making a supplying-end module transmit electric power to a receiving-end module and receive the data signals fed back from the receiving-end module within a planned cycle by synchronizing the timer without any influence of electric load noise.

The primary object of the present invention is to install timers and programs in microprocessors of a supplying-end module and a receiving-end module. The supplying-end module can predict the time for generating the trigger signal at the receiving-end module, during which the supplying-end module performs steps for detecting signals to avoid omission in a short time period. Under the condition of high power transmission, the induction type power supply system performs pre-reduction of power output on a supplying-end coil prior to the time expected for generating trigger data, making the main carrier wave amplitude decrease in a short time period and making it easy for the trigger signals from the receiving-end module to be analyzed by the supplying-end module under the condition of high power transmission. Each time when data are transmitted, timers are mutually calibrated and synchronized again, so that the supplying-end module only transmits power and does not detect and receive data in the period when no data are expected to be transmitted, thus preventing interference of power load noise and enabling the induction type power supply system to transmit data code stably in power supply applications.

The secondary object of the present invention is to electrically connect a microprocessor of a supplying-end module with a power drive unit, a signal analysis circuit, a coil voltage detection circuit, a display unit, a power supply unit and a grounding terminal. The power drive unit is further connected with a resonant circuit and a supplying-end coil to establish inductive relationship between the supplying-end coil and receiving-end coil for power and signal transmission. Besides, a microprocessor of a receiving-end module is electrically connected with a voltage detection circuit, a breaker protection circuit, a voltage stabilizing circuit, an amplitude modulation circuit, a direct current step-down transformer, a rectifier and filter circuit and a resonant circuit respectively. The timers and programs installed in the supplying-end and receiving-end microprocessors are used to predict the time for generating trigger data, and the supplying-end module can eliminate signal noise of electric power other than data signals. Unlike the non-time-synchronization method adopted in the past that is unable to distinguish between data and signal noise and needs long feedback signals to distinguish data from noise, resulting in consumption of more power, the present invention can shorten the time for feeding back signals from the receiving-end module to its maximum and generating short-pulse signals similar to changes in output load of the receiving-end module, thus achieving the purpose of saving energy.

DETAILED DESCRIPTION OF THE PREFERRED EMBODIMENT

Figure 1:
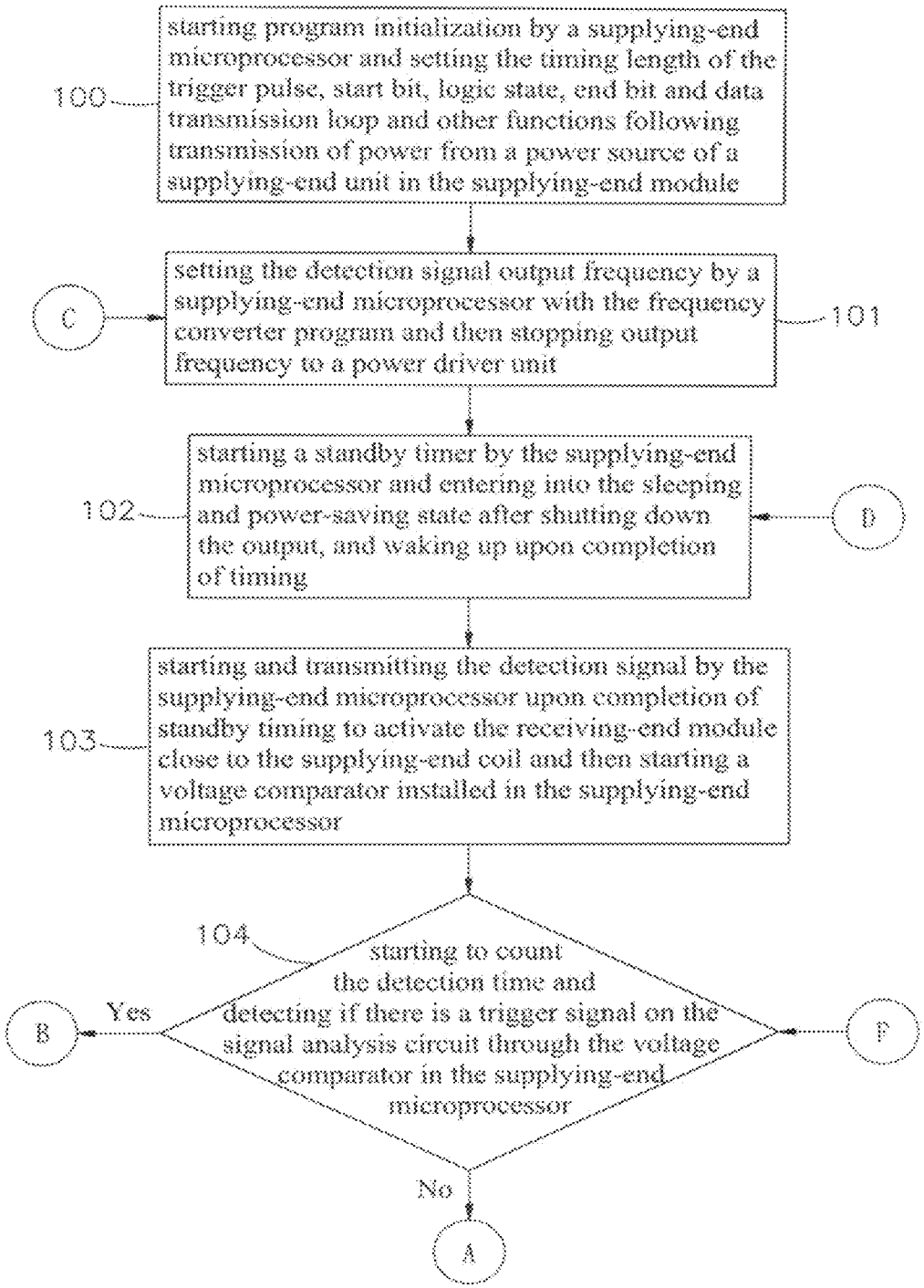
FIG. 1 is an operation flow chart for supplying power in accordance with the present invention (1).
Figure 2:
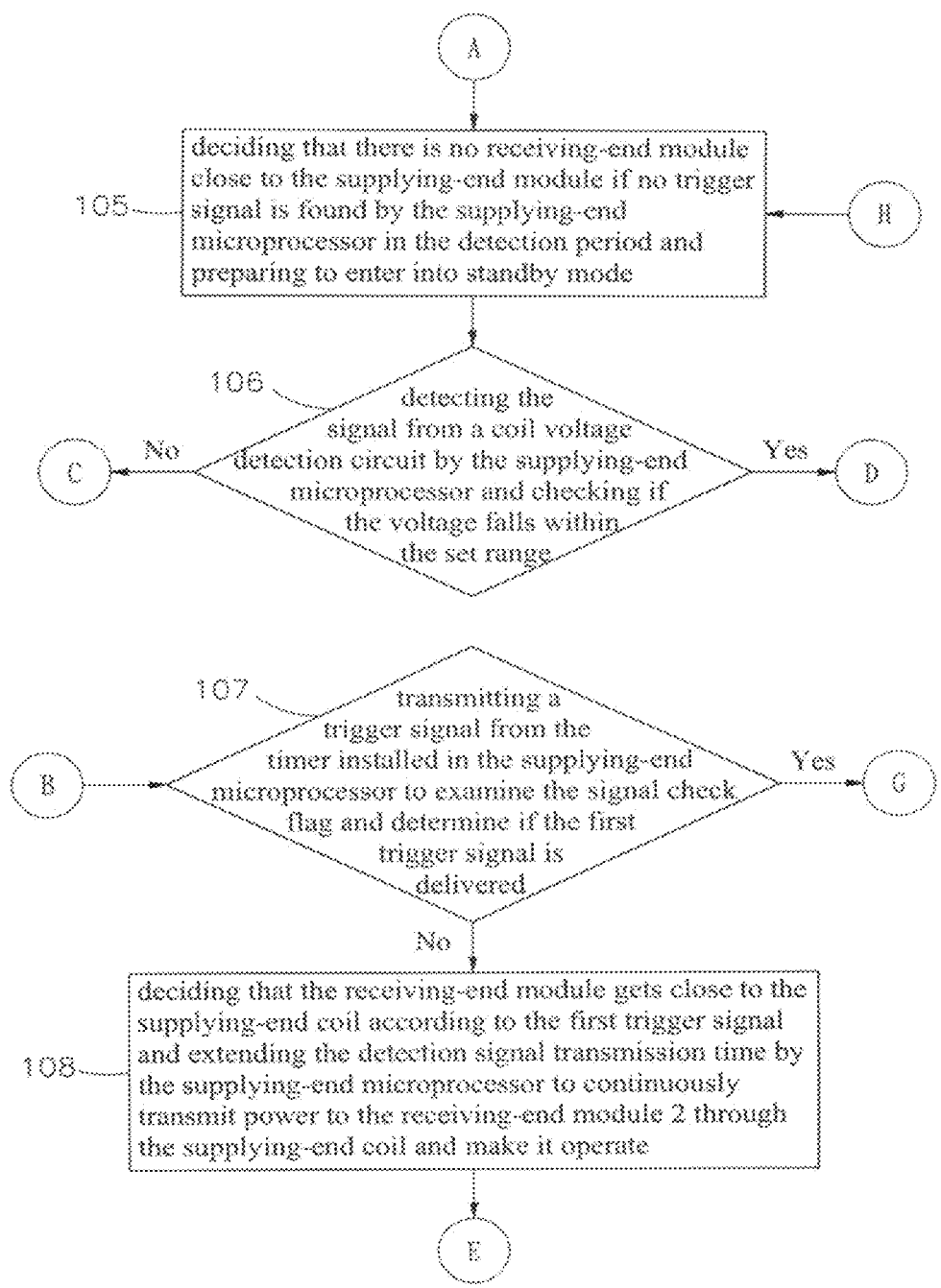
FIG. 2 is an operation flow chart for supplying power in accordance with the present invention (2).
Figure 3:
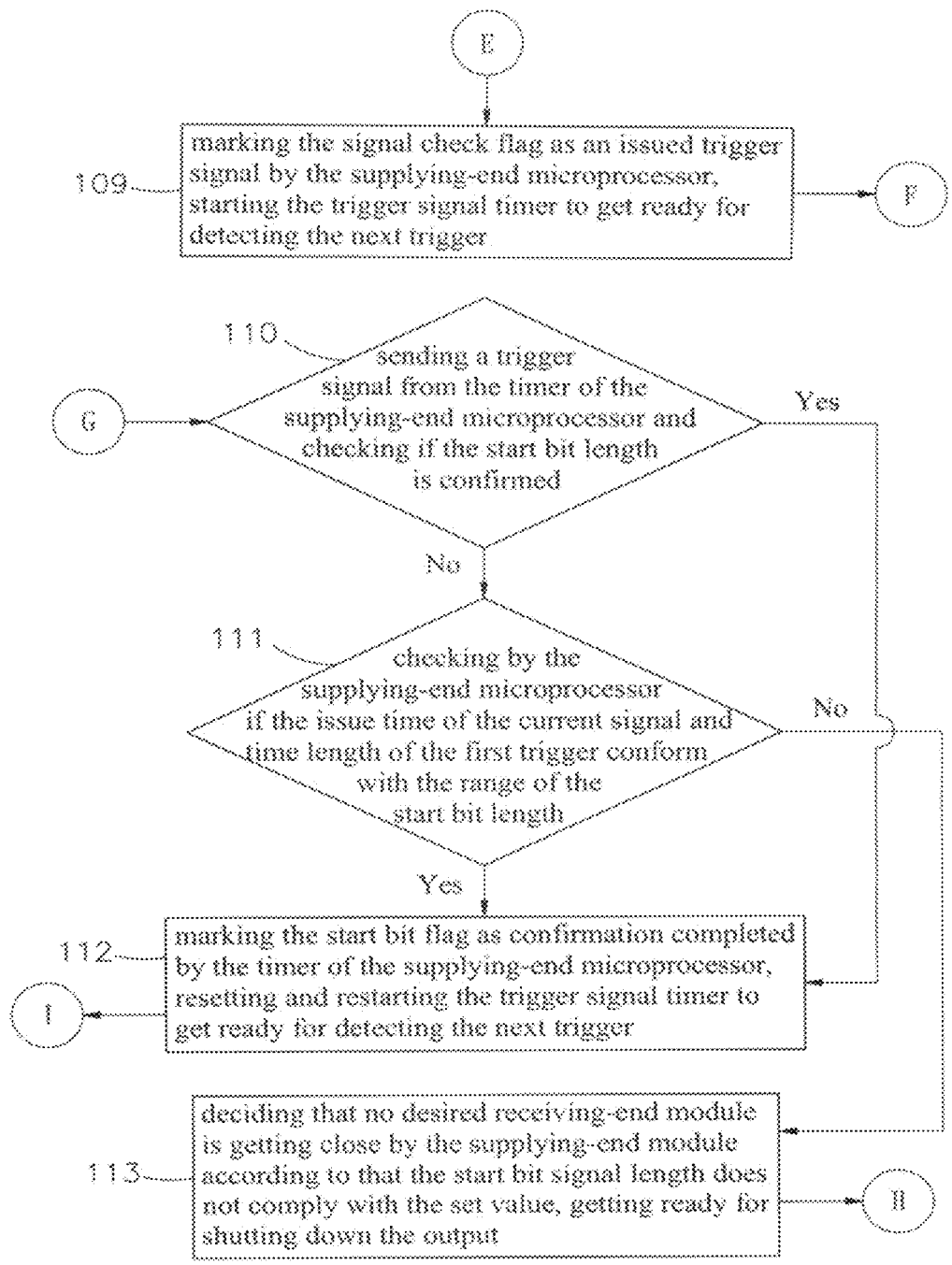
FIG. 3 is an operation flow chart for supplying power in accordance with the present invention (3).
Figure 4:
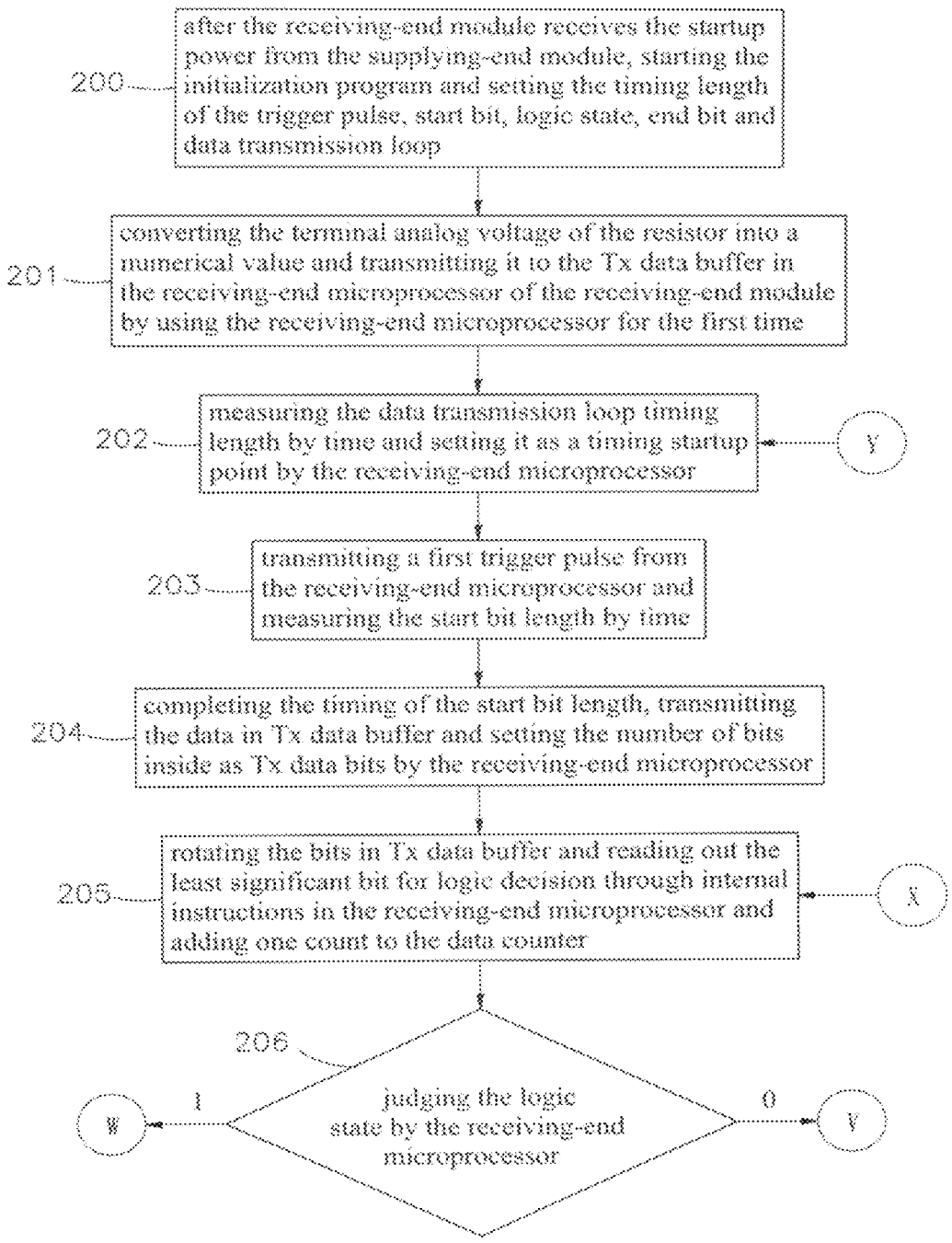
FIG. 4 is an operation flow chart of the receiving-end module after receiving power in accordance with the present invention (1).
Figure 5:
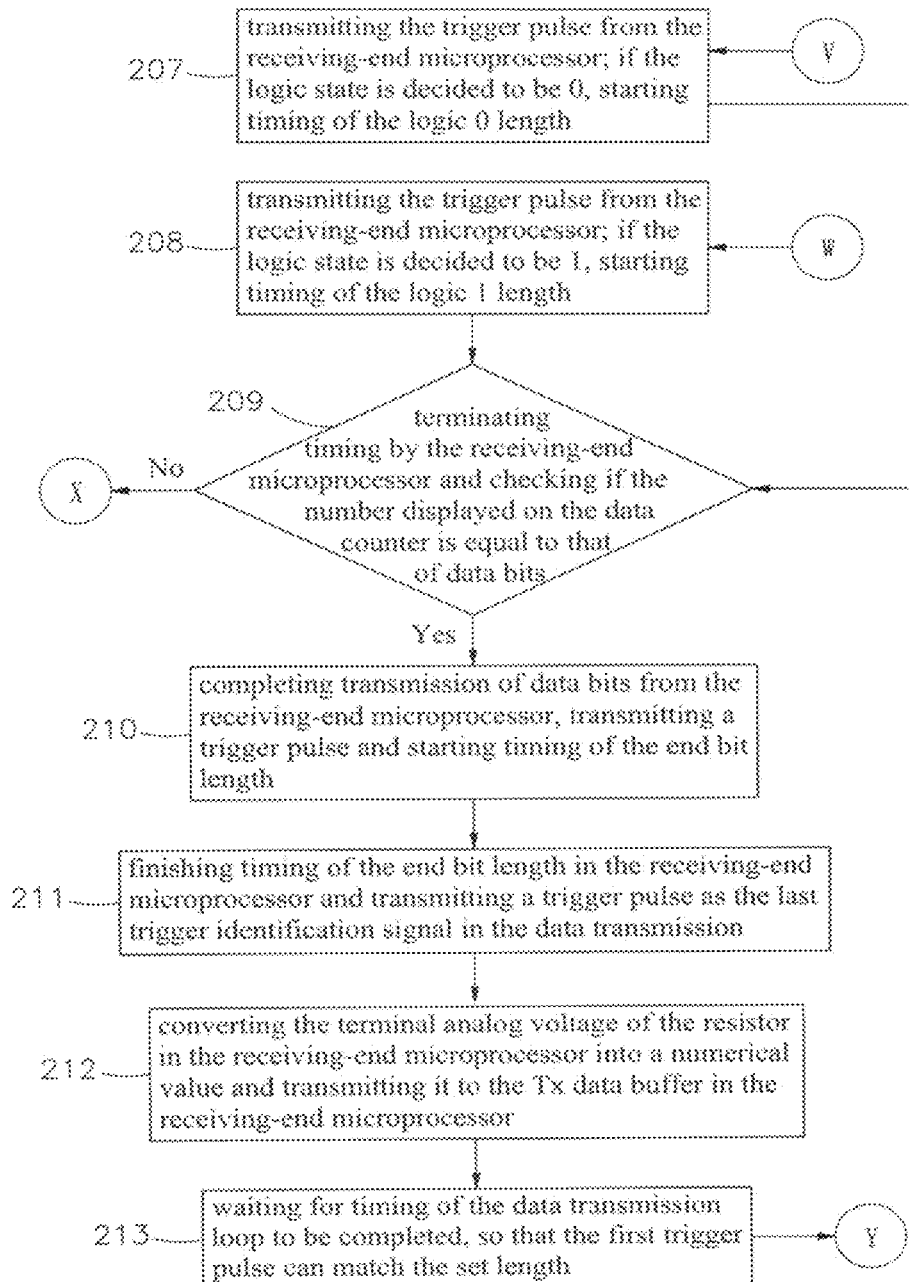
FIG. 5 is an operation flow chart of the receiving-end module after receiving power in accordance with the present invention (2).
Figure 6:
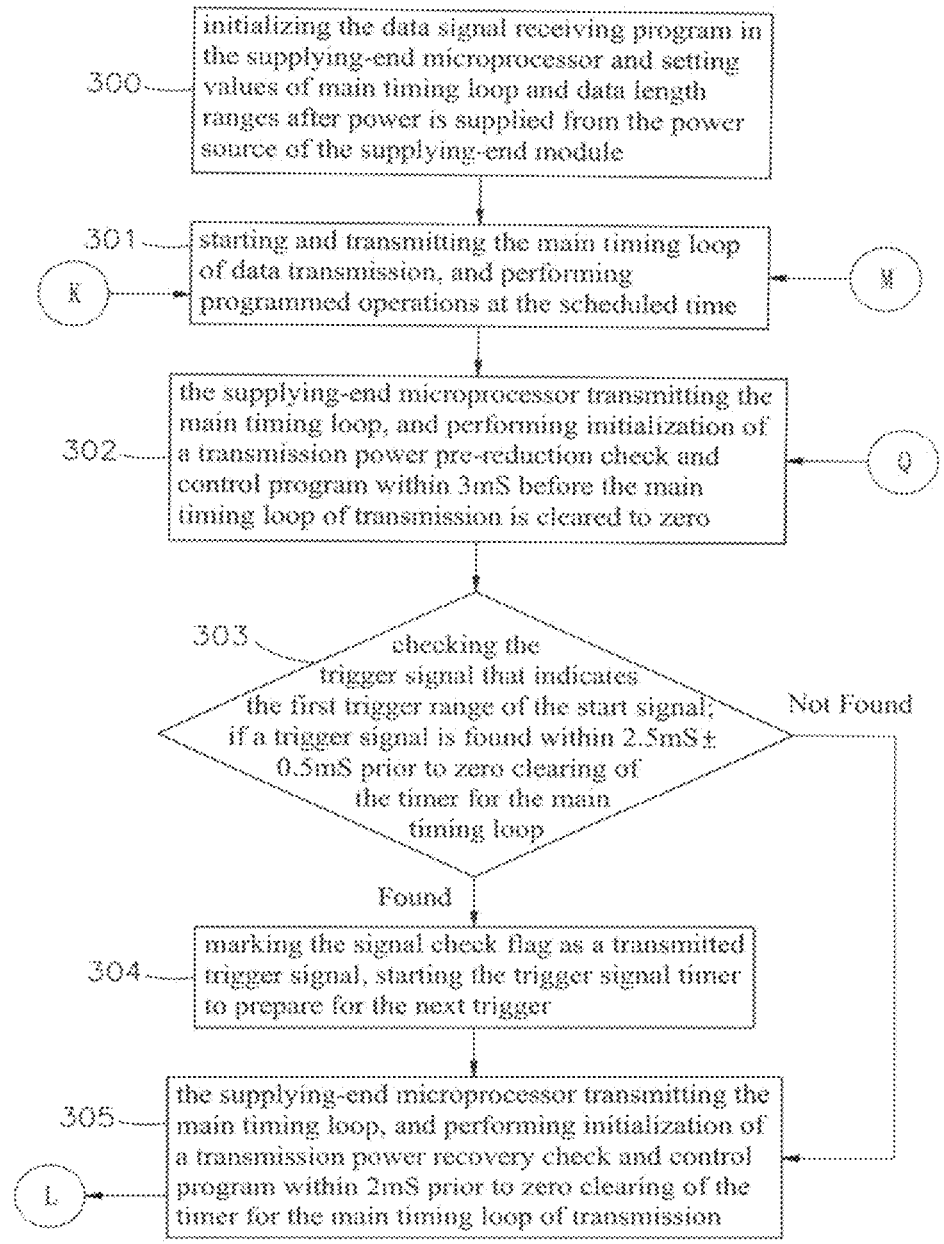
FIG. 6 is an operation flow chart for synchronous power supply and data transmission in accordance with the present invention (1).
Figure 7:
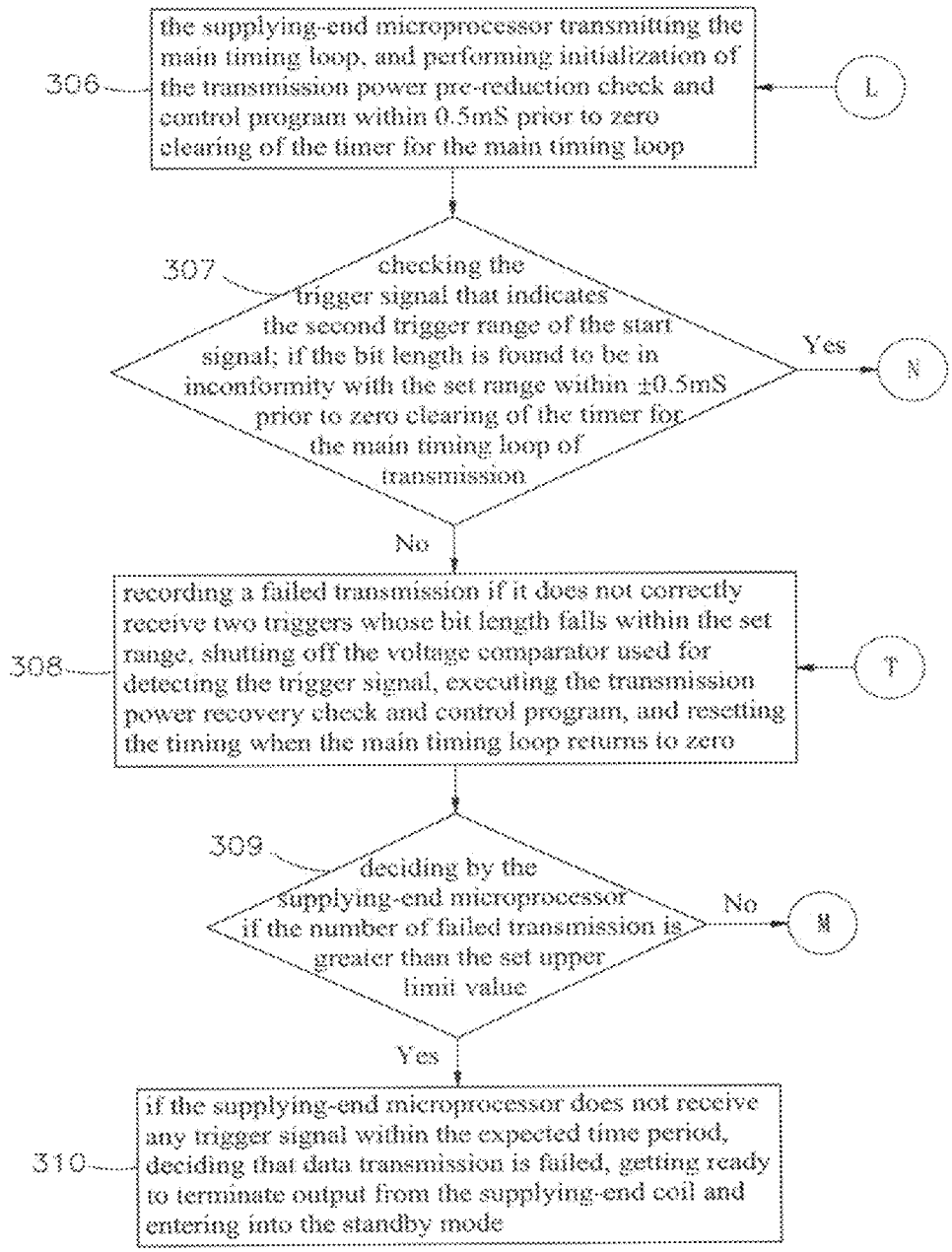
FIG. 7 is an operation flow chart for synchronous power supply and data transmission in accordance with the present invention (2).
Figure 8:
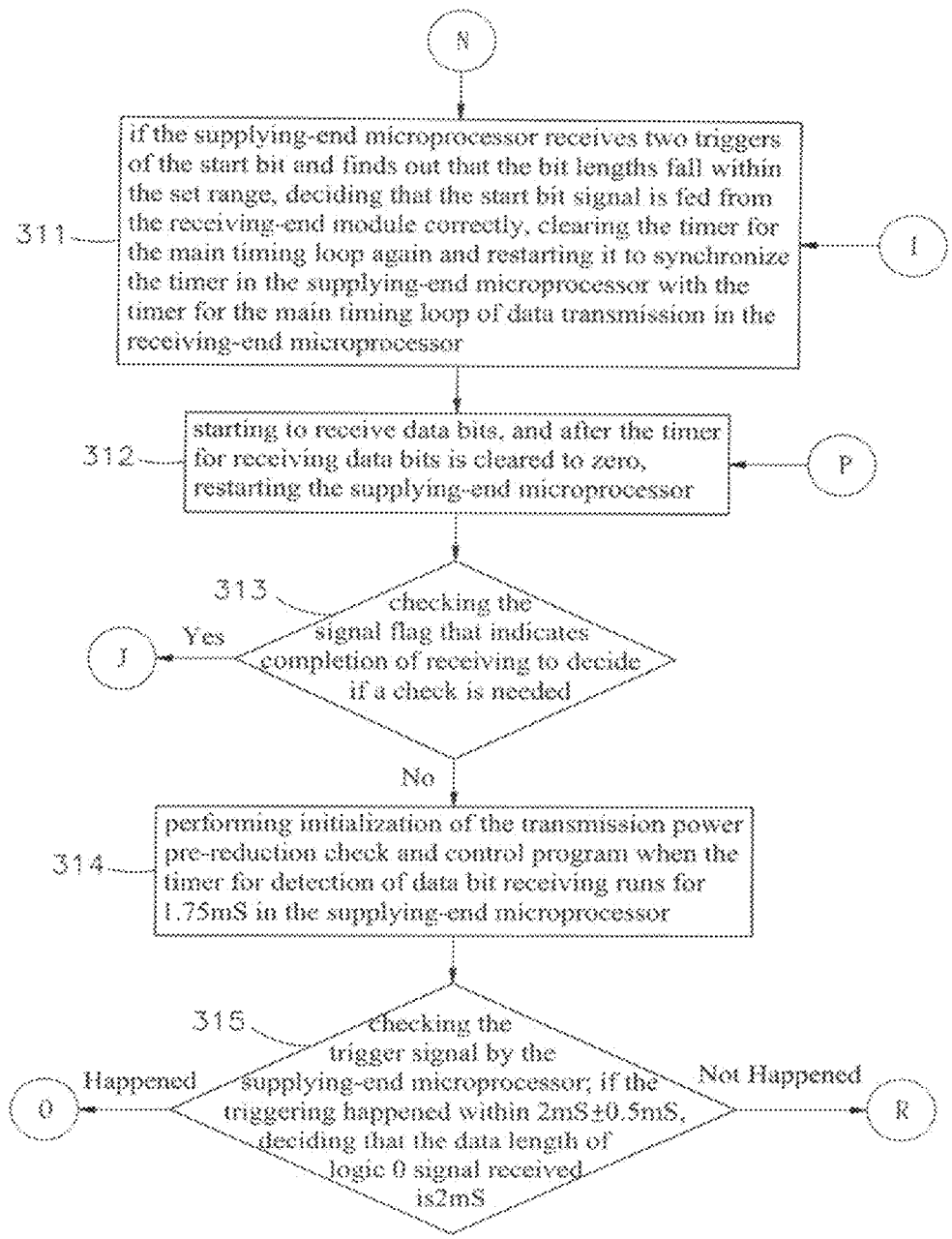
FIG. 8 is an operation flow chart for synchronous power supply and data transmission in accordance with the present invention (3).
Figure 9:
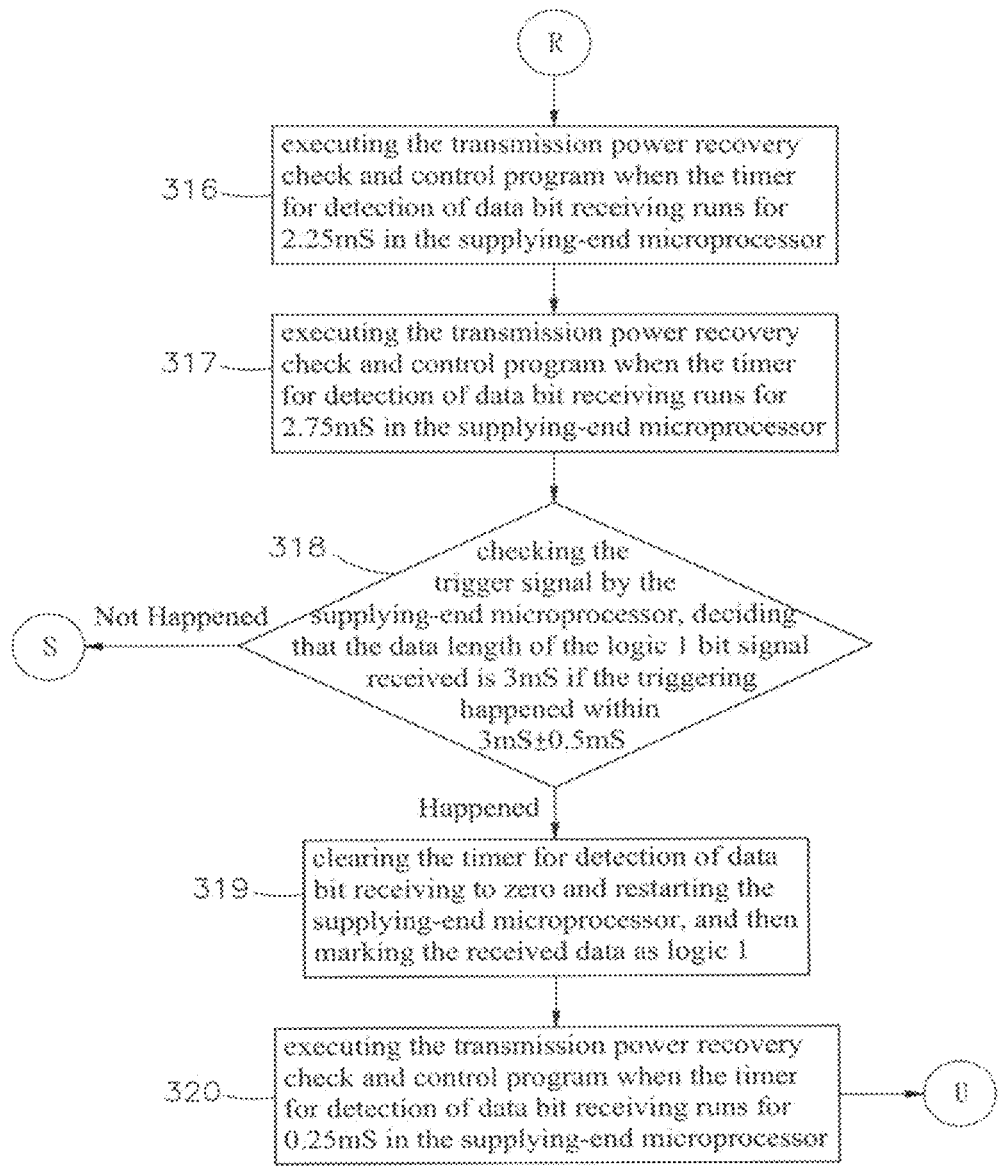
FIG. 9 is an operation flow chart for synchronous power supply and data transmission in accordance with the present invention (4).
Figure 10:
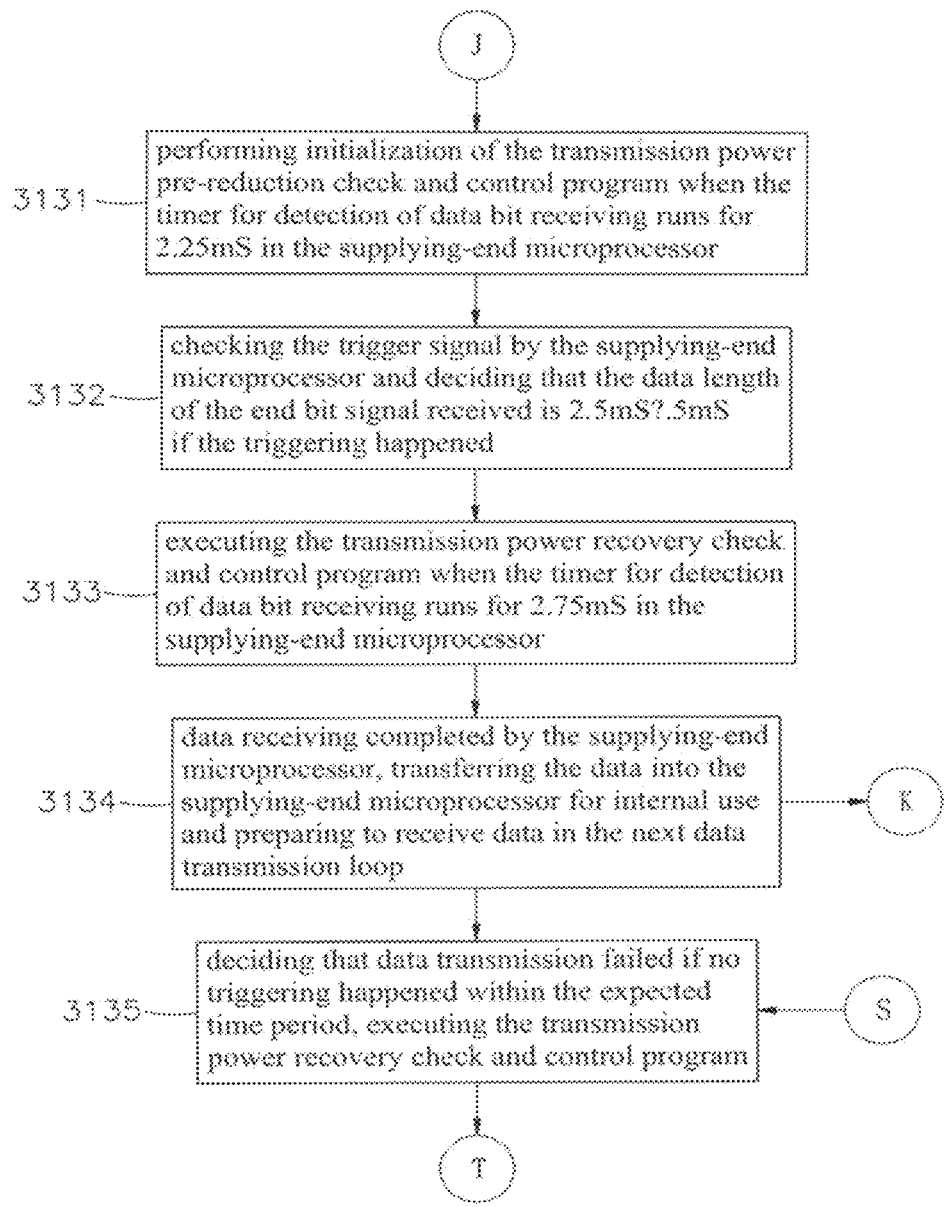
FIG. 10 is an operation flow chart for synchronous power supply and data transmission in accordance with the present invention (5).
Figure 11:
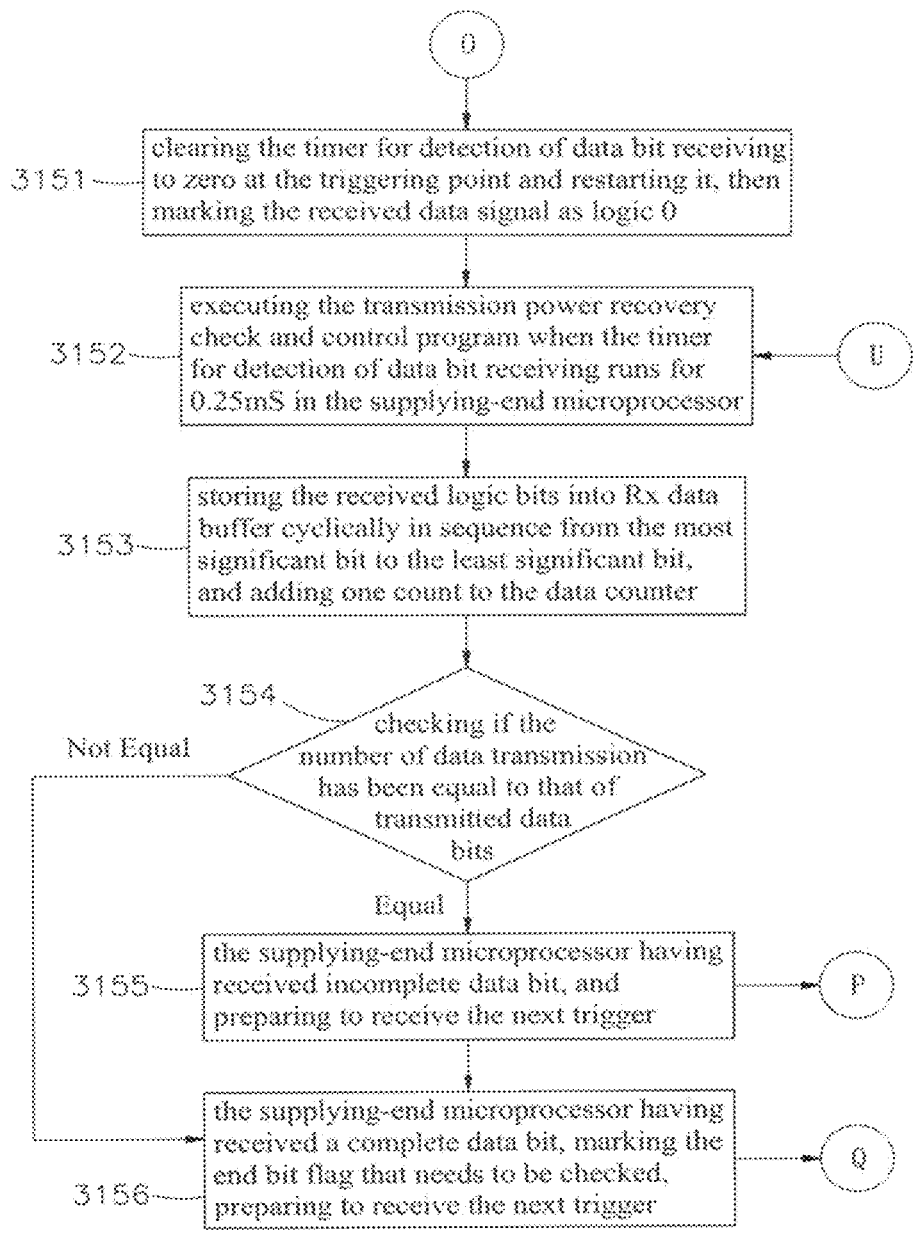
FIG. 11 is an operation flow chart for synchronous power supply and data transmission in accordance with the present invention (6).
Figure 12:
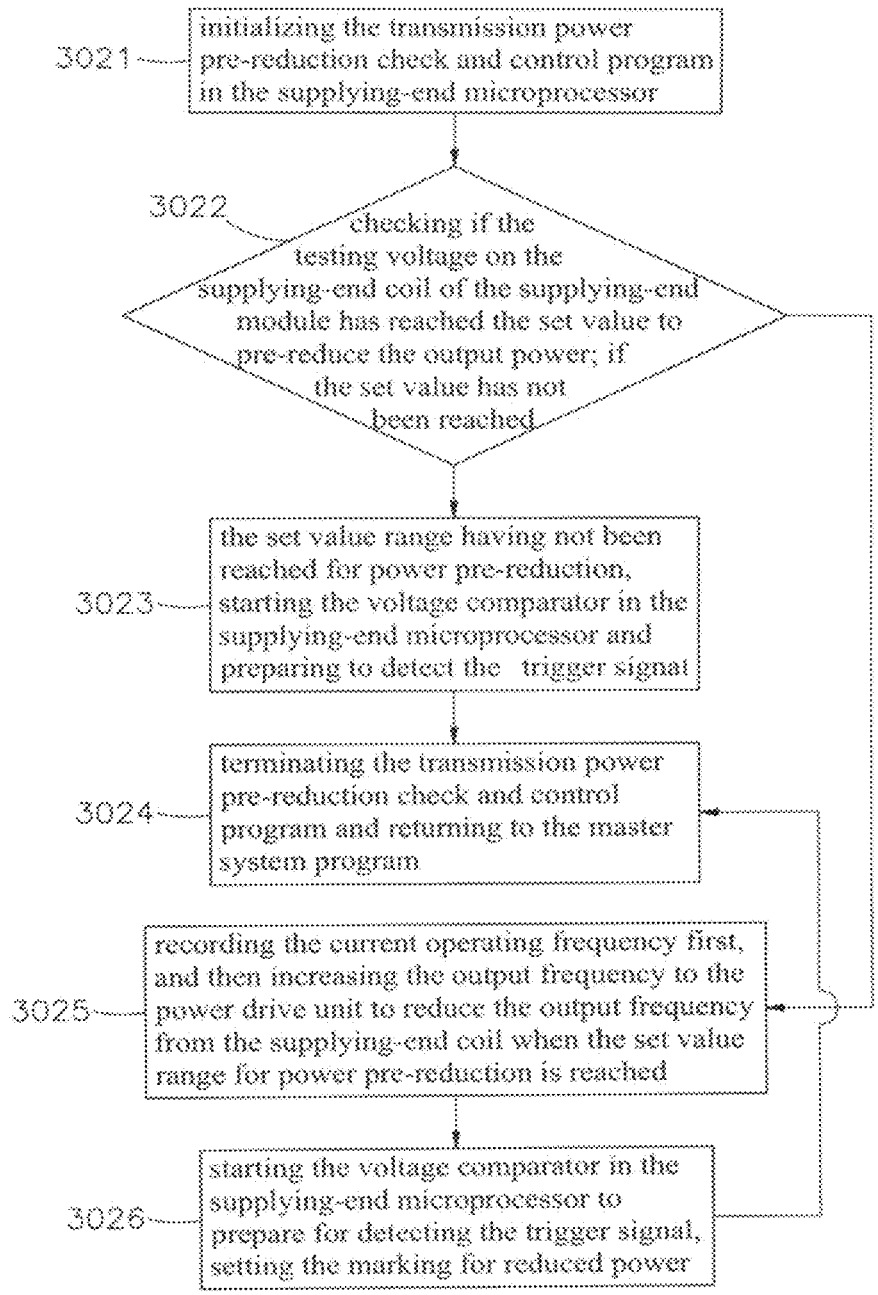
FIG. 12 is an operation flow chart of initialization of the transmission power pre-reduction check and control program before the transmission frequency is ready to reduce in accordance with the present invention.
Figure 13:
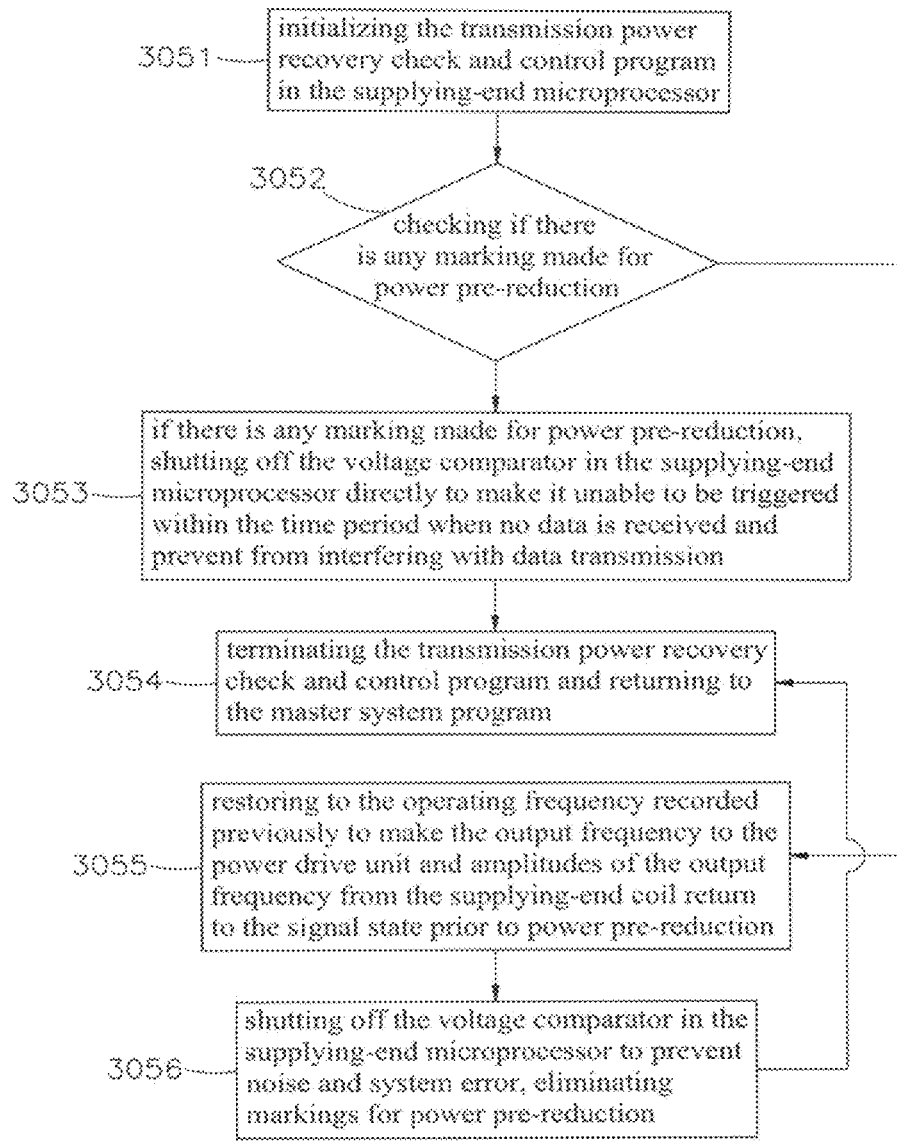
FIG. 13 is an operation flow chart of initialization of the transmission power recovery check and control program before the transmission frequency is ready to restore in accordance with the present invention.
Figure 14:
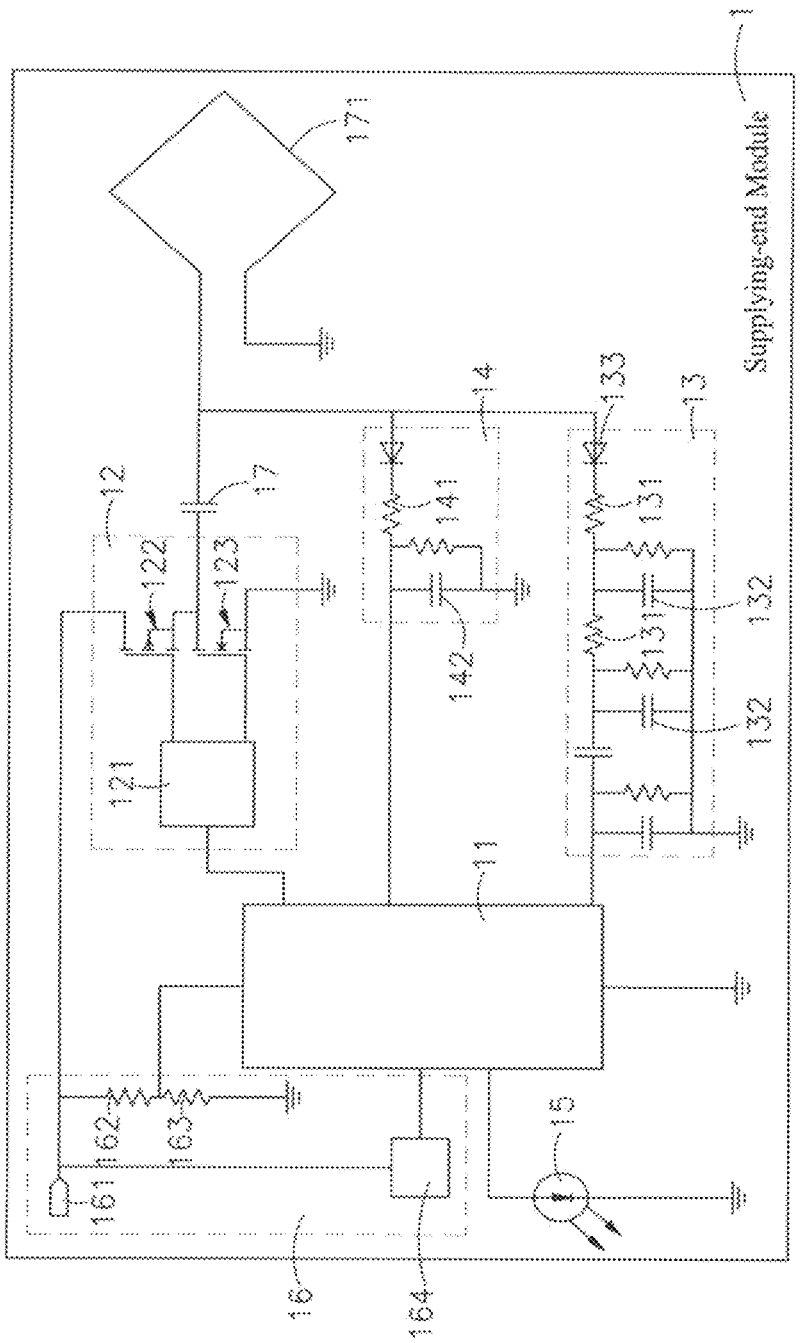
FIG. 14 is a schematic circuit diagram of the supplying-end module in accordance with the present invention.
Figure 15:
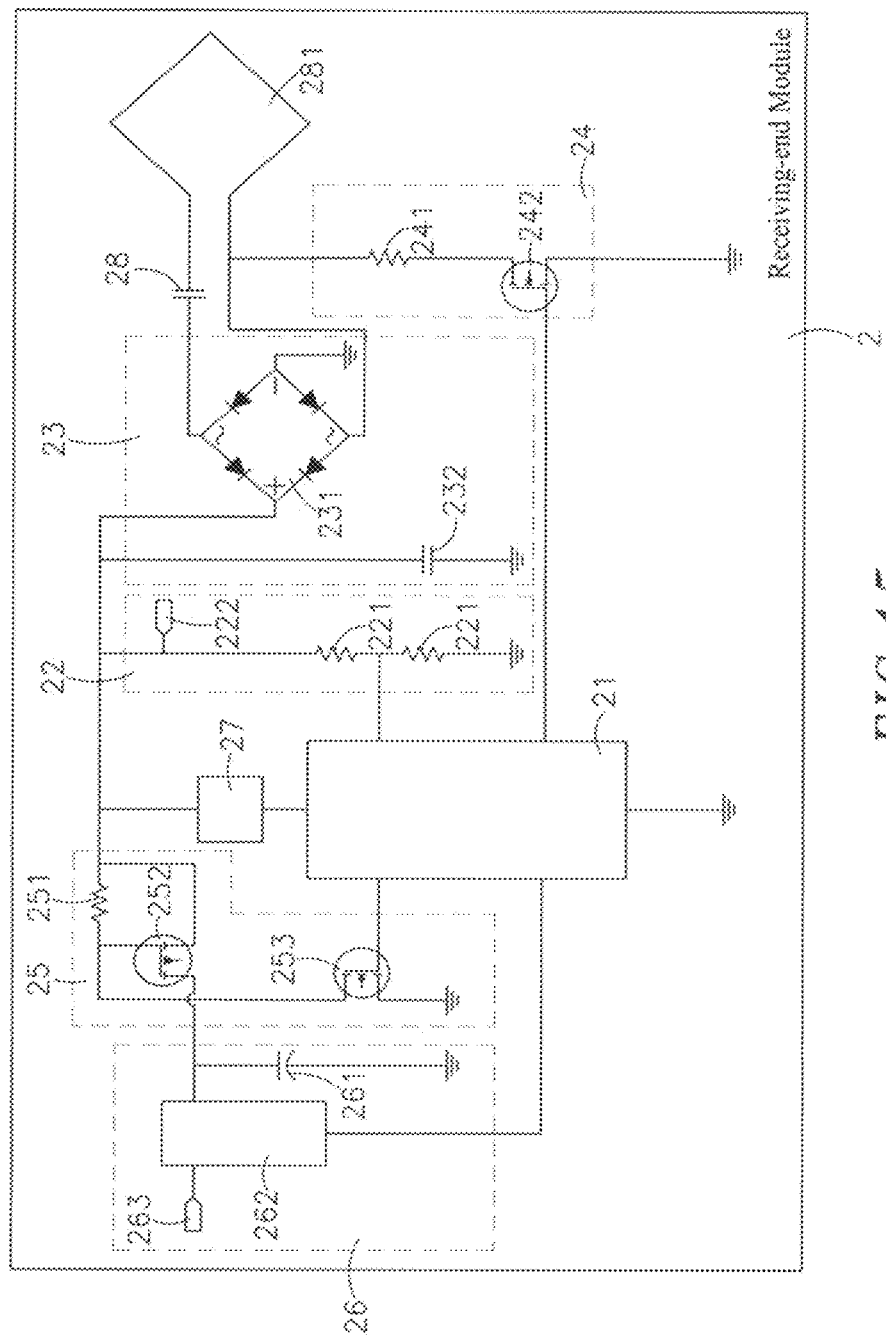
FIG. 15 is a schematic circuit diagram of the receiving-end module in accordance with the present invention.

To achieve the aforesaid objects and functions as well as the techniques adopted in the present invention and its fabrication, examples of the preferred embodiment of the present invention are given below to illustrate its features and functions in detail by referring to the accompanying drawings.

Referring to FIGS. 1, 2, 14, 15, 19, 20, 21, 22, 23, 24, 25 and 26, an induction type power supply system disclosed in the present invention includes a supplying-end module 1 and a receiving-end module 2. A method of transmitting power and data signals from said modules to a preset electronic device comprises the steps of:

(100) starting program initialization by a supplying-end microprocessor and setting the timing length of the trigger pulse, start bit, logic state, end bit and data transmission loop and other functions following supply of power from a power source 161 of a power supply unit 16 in the supplying-end module 1.

(101) setting the detection signal output frequency by a supplying-end microprocessor 11 with the frequency converter program and then stopping output frequency to a power driver unit 12;

(102) starting a standby timer by the supplying-end microprocessor 11 and entering into the sleeping and power-saving state after shutting down the output, and waking up upon completion of timing;

(103) starting and transmitting the detection signal by the supplying-end microprocessor 11 upon completion of standby timing to activate the receiving-end module 2 close to a supplying-end coil 171 and then starting a voltage comparator installed in the supplying-end microprocessor 11;

(104) starting to count the detection time and detecting if there is a trigger signal on the signal analysis circuit 13 through the voltage comparator in the supplying-end microprocessor 11; proceeding to step (105) if there is no trigger signal; otherwise, proceeding to step (107);

(105) deciding that there is no receiving-end module 2 close to the supplying-end module 1 if no trigger signal is found by the supplying-end microprocessor 11 in the detection period and preparing to enter into standby mode;

(106) detecting the signal from a coil voltage detection circuit 14 by the supplying-end microprocessor 11 and checking if the voltage falls within the set range; proceeding to step (101) to reset the detection signal output frequency if the voltage does not fall within the set range; otherwise, proceeding to step (102) and shutting off the output;

(107) transmitting a trigger signal from the timer installed in the supplying-end microprocessor 11 to examine the signal check flag and determine if the first trigger signal is delivered, proceeding to step (108) if no, otherwise proceeding to step (110);

(108) deciding that the receiving-end module 2 gets close to the supplying-end coil 171 according to the first trigger signal and extending the detection signal transmission time by the supplying-end microprocessor 11 to continuously transmit power to the receiving-end module 2 through the supplying-end coil 171 and make it operate;

(109) marking the signal check flag as an issued trigger signal by the supplying-end microprocessor 11, starting the trigger signal timer to get ready for detecting the next trigger and proceeding to step (104);

(110) sending a trigger signal from the timer of the supplying-end microprocessor 11 and checking if the start bit length is confirmed; proceeding to step (111) if the start bit length is not confirmed; otherwise, proceeding to step (112);

(111) checking by the supplying-end microprocessor 11 if the issue time of the current trigger signal and time length of the first trigger signal conform with the range of the start bit length; proceeding to step (112) if yes, and proceeding to step (113) if not;

(112) marking the start bit flag as confirmation completed by the timer of the supplying-end microprocessor 11, resetting and restarting the trigger signal timer to get ready for detecting the next trigger and continuing to implement step (311);

(113) deciding that no desired receiving-end module 2 is getting close by the supplying-end module 11 according to that the start bit signal length does not comply with the set value, getting ready for shutting down the output and proceeding to step (105).

As shown clearly in FIGS. 1, 2, 3, 4, 5, 14, 15, 22, 23, 24, 25, 26, 27 28 and 29, after receiving the power from the supplying-end module 1, the receiving-end module 2 implements the steps of:

(200) after the receiving-end module 2 receives the startup power from the supplying-end module 1, starting the initialization program and setting the timing length of the trigger pulse, start bit, logic state, end bit and data transmission loop;

(201) converting the terminal analog voltage of the resistor 221 into a numerical value and transmitting it to the Tx data buffer in the receiving-end microprocessor 21 of the receiving-end module 2 by using the receiving-end microprocessor 21 for the first time;

(202) measuring the data transmission loop timing length by time and setting it as a timing startup point by the receiving-end microprocessor 21 (50 mS, for example);

(203) transmitting a first trigger pulse from the receiving-end microprocessor 21 and measuring the start bit length by time (2.5 mS, for example);

(204) completing the timing of the start bit length, transmitting the data in Tx data buffer and setting the number of bits inside as Tx data bits by the receiving-end microprocessor 21;

(205) rotating the bits in Tx data buffer and reading out the least significant bit (LSB) for logic decision through internal instructions in the receiving-end microprocessor 21 and adding one count to the data counter;

(206) judging the logic state by the receiving-end microprocessor 21; proceeding to step (207) if the logic state is 0, or proceeding to step (208) if the logic state is 1;

(207) transmitting the trigger pulse from the receiving-end microprocessor 21; if the logic state is decided to be 0, starting timing of the logic 0 length and proceeding to step (209) (2 mS, for example);

(208) transmitting the trigger pulse from the receiving-end microprocessor 21; if the logic state is decided to be 1, starting timing of the logic 1 length and proceeding to step (209) (3 mS, for example);

(209) terminating timing by the receiving-end microprocessor 21 and checking if the number displayed on the data counter is equal to that of data bits; proceeding to step (210) if yes, and proceeding to step (205) if not;

(210) completing transmission of data bits from the receiving-end microprocessor 21, transmitting a trigger pulse and starting timing of the end bit length (2.5 mS, for example);

(211) finishing timing of the end bit length in the receiving-end microprocessor and transmitting a trigger pulse as the last trigger identification signal in the data transmission;

(212) converting the terminal analog voltage of the resistor 221 in the receiving-end microprocessor 21 into a numerical value and transmitting it to the Tx data buffer in the receiving-end microprocessor 21.

(213) waiting for timing of the data transmission loop to be completed, so that the first trigger pulse can match the set length (for example, 50 mS) and proceeding to step (202) before the start bit is transmitted in every data transmission.

Moreover, the induction type power supply system disclosed in the present invention comprises a supplying-end module 1 and a receiving-end module 2.

The supplying-end module 1 includes a supplying-end microprocessor 11, in which operation and control programs, signal analysis software programs with anti-noise function and other related software programs, a timer used for timing of signal pulse spacing length and a voltage comparator used to detect pulse signal triggering are built. The supplying-end microprocessor 11 is electrically connected with a power drive unit 12, a signal analysis circuit 13, a coil voltage detection circuit 14, a display unit 15 and a power supply unit 16 respectively. The power drive unit 12 has a MOSFET driver 121 connected with the supplying-end microprocessor 11, a high-side MOSFET component 122 and a low-side MOSFET component 123 respectively, where both MOSFET components are connected to a resonant circuit 17, and the high-side MOSFET component 122 is further connected with the power supply unit 16 electrically. The signal analysis circuit 13 comprises a rectifier diode 133 electrically connected to the resonant circuit 17, a plurality of resistors 131 electrically connected in series to the rectifier diode 133, and a plurality of capacitors 132 connected in parallel to the series of resistors 131. The power supply unit 16 comprises a power source 161, a detection divider resistor 162 and a detection divider resistor 163 connected in series and a direct current (DC) step-down transformer 164, and is connected with the power drive unit 12. The resonant circuit 17 is connected with a supplying-end coil 171 capable of transmitting power and receiving data signals.

The receiving-end module 2 includes a receiving-end microprocessor 21, in which operation, control and related software programs and a timer used for timing of transmitted signal pulse spacing length are installed. The receiving-end microprocessor 21 is connected with a voltage detection circuit 22, a rectifier and filter circuit 23, an amplitude modulation circuit 24, a breaker protection circuit 25, a voltage stabilizing circuit 26 and a direct current (DC) step-down transformer 27 respectively. The voltage detection circuit 22 has a plurality of resistors 221 connected electrically in series to the receiving-end microprocessor 21 and detection points 222 electrically connected with the resistors 221, the rectifier and filter circuit 23, the breaker protection circuit and the DC step-down transformer 27 respectively. The rectifier and filter circuit 23 includes a rectifier 231 and a capacitor 232 that are respectively connected in parallel with the voltage detection circuit 22, the breaker protection circuit 25 and the DC step-down transformer 27, and the rectifier 231 is connected in parallel with the resonant circuit 28 and a receiving-end coil 281 through the rectifier 231. The receiving-end coil 281 is connected in series with the amplitude modulation circuit 24. The amplitude modulation circuit 24 comprises a resistor 241 and an N-type MOSFET component 242 connected in series to the resistor 241. The breaker protection circuit 25 includes a resistor 251, a P-type MOSFET component 252 and an N-type MOSFET component 253, of which the N-type MOSFET component 253 is utilized to electrically connect to the receiving-end microprocessor 21. Besides, the P-type MOSFET component 252 is electrically connected with a buffer capacitor 261 and a DC step-down transformer 262 linked electrically with a power output terminal 263 on the voltage stabilizing circuit 26. Furthermore, the voltage detection circuit 22, breaker protection circuit 25, voltage stabilizing circuit 26 and DC step-down transformer 27 are electrically connected to the receiving-end microprocessor 21 respectively, and the voltage detection circuit 22, breaker protection circuit 25 and DC step-down transformer 27 are electrically connected to the rectifier and filter circuit 23. The rectifier and filter circuit 23 is further connected via the rectifier 231 to the resonant circuit 28 electrically. Thus, the resonant circuit 28 is electrically connected with the receiving-end coil 281.

The induction type power supply system in the above embodiment is capable of transmitting power and data synchronously by using the supplying-end coil 171 of the supplying-end module 1 and the receiving-end coil 281 of the receiving-end module 2, and can secure stable transmission of data signals regardless of the power to be transmitted. For transmission of high power between the supplying-end module 1 and receiving-end module 2, the power is reduced first to allow the data trigger signal to be transmitted successfully and then restored; during the period when no data signal is transmitted, the supplying-end module 1 will shut down the voltage comparator used to detect the trigger signal, i.e., deactivate the function of receiving data trigger signal, so that the noise interference resulting from load changes in the power transmission will not be processed and recognized by the supplying-end microprocessor 11.

Figure 16:
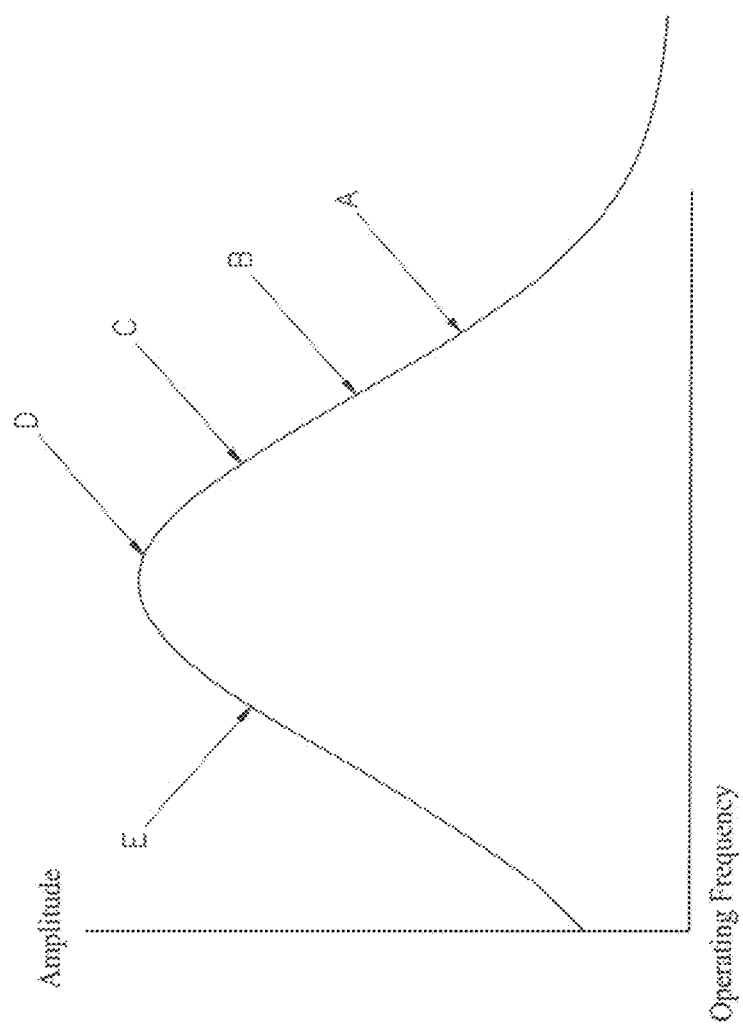
FIG. 16 is a chart illustrating waveform amplitude variation at data signal modulation point in accordance with the present invention.
Figure 17:
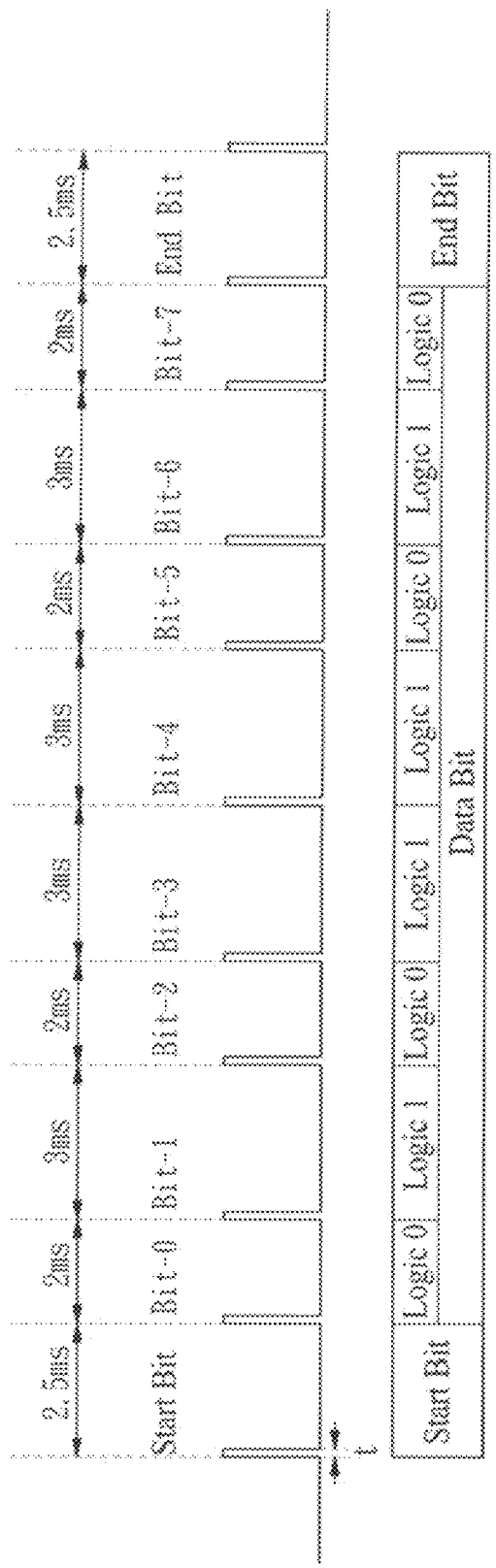
FIG. 17 illustrates a control signal of the N-type MOSFET component drawing of the receiving-end module in accordance with the present invention.

However, the above function needs to be achieved through precise and careful arrangement between the supplying-end module 1 and receiving-end module 2, so that the supplying-end module 1 predicts the time to transmit data signals by the receiving-end module 2, starts the voltage comparator used for detecting the trigger signal in the supplying-end microprocessor 11 only during transmission of data trigger signals and will not perform other operations during data transmission, except for detecting the trigger signals from the receiving-end module 2. After the power for transmitting electric power is increased, the operating voltage wave amplitude is lowered from Point C (or point D, referring to FIG. 16) to Point B prior to data signal triggering, so that the modulated trigger signal wave amplitude will increase from Point B to Point C or D. The trigger signal processed in this way is still capable of increasing amplitude changes, thus solving the problem that the signal wave amplitude at Point E is lower than that at Point C or D following high power modulation, which may result in system error. Moreover, each time when data signals are transmitted, the supplying-end module 1 will also calibrate its timer against the synchronous time of the receiving-end module 2 to secure correct timing in every process of data transmission, and the data signals are received by the supplying-end coil 171 correctly in the process when the receiving-end module 2 is transmitting trigger signals. For the receiving-end microprocessor 21 of the receiving-end module 2, it is only necessary to transmit trigger pulses without the need to consider the length of data signals to be modulated, as it can shorten the time for data signal modulation to the largest degree, reduce the energy loss in the process of modulation, and reduce vibrations of the receiving-end coil 281 caused by current changes during transmission of data signals.

As shown clearly in FIGS. 1, 2, 3, 6, 7, 8, 9, 10, 11, 12, 13, 14, 15, 19, 20, 21, 22, 23, 24, 25, 26, 27, 28 and 29, according the embodiment of the present invention, the method for synchronous transmission of power and data signals in the induction type power supply system comprises the steps of:

(300) initializing a data signal receiving program in the supplying-end microprocessor 11 and setting values of main timing loop and data length ranges after power is supplied from the power source 161 of the supplying-end module 1;

(301) the supplying-end microprocessor 11 starting and transmitting the main timing loop of data transmission, and performing programmed operations at the scheduled time;

(302) the supplying-end microprocessor 11 transmitting the main timing loop, and performing initialization of a transmission power pre-reduction check and control program within 3 mS before the main timing loop of transmission is cleared to zero;

(303) checking the trigger signal that indicates the first trigger range of the start signal; if a trigger signal is found within 2.5 mS±0.5 mS prior to zero clearing of the timer for the main timing loop, proceeding to step (304); otherwise, proceeding to step (305);

(304) marking the signal check flag as a transmitted trigger signal, starting the trigger signal timer to prepare for the next trigger and proceeding to step (305);

(305) the supplying-end microprocessor 11 transmitting the main timing loop, and performing initialization of a transmission power recovery check and control program within 2 mS prior to zero clearing of the timer for the main timing loop of transmission;

(306) the supplying-end microprocessor 11 transmitting the main timing loop, and performing initialization of the transmission power pre-reduction check and control program within 0.5 mS prior to zero clearing of the timer for the main timing loop;

(307) checking the trigger signal that indicates the second trigger range of the start signal; if the bit length is found to be in inconformity with the set range within ±0.5 mS prior to zero clearing of the timer for the main timing loop of transmission, proceeding to step (308); if both triggers are completed and the length range is satisfied, proceeding to step (311);

(308) recording a failed transmission if the supplying-end microprocessor 11 does not correctly receive two triggers whose bit length falls within the set range, shutting off the voltage comparator used for detecting the trigger signal, executing the transmission power recovery check and control program, and resetting the timing when the main timing loop returns to zero;

(309) deciding by the supplying-end microprocessor 11 if the number of failed transmission is greater than the set upper limit value; proceeding to step (310) if the upper limit value is reached; otherwise, proceeding to step (301);

(310) if the supplying-end microprocessor 11 does not receive any trigger signal within the expected time period, deciding that data transmission is failed, getting ready to terminate output from the supplying-end coil 171 and entering into the standby mode;

(311) if the supplying-end microprocessor 11 receives two triggers of the start bit and finds out that the bit lengths fall within the set range, deciding that the start bit signal is fed from the receiving-end module 2 correctly, clearing the timer for the main timing loop again and restarting it to synchronize the timer in the supplying-end microprocessor 11 with the timer for the main timing loop of data transmission in the receiving-end microprocessor 21;

(312) starting to receive data bits, and after the timer for receiving data bits is cleared to zero, restarting the supplying-end microprocessor 11;

(313) checking the signal flag that indicates completion of receiving to decide if a check is needed; proceeding to step (3131) if check is needed; otherwise, proceeding to step (314);

(3131) performing initialization of the transmission power pre-reduction check and control program when the timer for detection of data bit receiving runs for 2.25 mS in the supplying-end microprocessor 11;

(3132) checking the trigger signal by the supplying-end microprocessor 11 and deciding that the data length of the end bit signal received is 2.5 mS±0.5 mS;

(3133) executing the transmission power recovery check and control program when the timer for detection of data bit receiving runs for 2.75 mS in the supplying-end microprocessor 11;

(3134) data receiving completed by the supplying-end microprocessor 11, transferring the data into the supplying-end microprocessor 11 for internal use and preparing to receive data in the next data transmission loop, and then proceeding to step (301);

(3135) deciding that data transmission is failed if no triggering happened within the expected time period, executing the transmission power recovery check and control program, and proceeding to step (308);

(314) performing initialization of the transmission power pre-reduction check and control program when the timer for detection of data bit receiving runs for 1.75 mS in the supplying-end microprocessor 11;

(315) checking the trigger signal by the supplying-end microprocessor 11; if the triggering happened within 2 mS±0.5 mS, deciding that the data length of logic 0 signal received is 2 mS and proceeding to step (3151); if no triggering happened, proceeding to step (316);

(3151) clearing the timer for detection of data bit receiving to zero at the triggering point and restarting it, then marking the received data signal as logic 0;

(3152) executing the transmission power recovery check and control program when the timer for detection of data bit receiving runs for 0.25 mS in the supplying-end microprocessor 11;

(3153) storing the received logic bits into Rx data buffer cyclically in sequence from the most significant bit to the least significant bit, and adding one count to the data counter;

(3154) checking if the number of data transmission has been equal to that of transmitted data bits; if yes, proceeding to step (3155); otherwise, proceeding to step (3156);

(3155) the supplying-end microprocessor 11 having received incomplete data bit, and preparing to receive the next trigger, and proceeding to step (312);

(3156) the supplying-end microprocessor 11 having received a complete data bit, marking the end bit flag that needs to be checked, preparing to receive the next trigger and proceeding to step (302);

(316) executing the transmission power recovery check and control program (3051) when the timer for detection of data bit receiving runs for 2.25 mS in the supplying-end microprocessor 11;

(317) executing the transmission power recovery check and control program (3021) when the timer for detection of data bit receiving runs for 2.75 mS in the supplying-end microprocessor 11;

(318) checking the trigger signal by the supplying-end microprocessor 11, deciding that the data length of the logic 1 bit signal received is 3 mS if the triggering happened within 3 mS±0.5 mS, and proceeding to step (319); proceeding to step (3135) if the triggering does not happen;

(319) clearing the timer for detection of data bit receiving to zero and restarting the supplying-end microprocessor, and then marking the received data as logic 1;

(320) executing the transmission power recovery check and control program when the timer for detection of data bit receiving runs for 0.25 mS in the supplying-end microprocessor 11 and then proceeding to step (3152);

Moreover, initialization of transmission power pre-reduction check and control program in step (302) comprises the steps of:

(3021) initializing the transmission power pre-reduction check and control program in the supplying-end microprocessor 11;

(3022) checking if the testing voltage on the supplying-end coil 171 of the supplying-end module 1 has reached the set value to pre-reduce the output power; if the set value has not been reached, proceeding to step (3023); otherwise, proceeding to step (3025);

(3023) if the set value range having not been reached for power pre-reduction, starting the voltage comparator in the supplying-end microprocessor 11 and preparing to detect the trigger signal;

(3024) terminating the transmission power pre-reduction check and control program and returning to the master system program;

(3025) recording the current operating frequency first, and then increasing the output frequency to the power drive unit 12 to reduce the output frequency from the supplying-end coil 171 when the set value range for power pre-reduction is reached;

(3026) starting the voltage comparator in the supplying-end microprocessor 11 to prepare for detecting the trigger signal, setting the marking for reduced power and proceeding to step (3024).

Furthermore, initialization of the transmission power recovery check and control program in step (305) comprises the steps of:

(3051) initializing the transmission power recovery check and control program in the supplying-end microprocessor 11;

(3052) checking if there is any marking made for power pre-reduction; if there is no marking, proceeding to step (3053); otherwise, proceeding to step (3055);

(3053) no marking made for power pre-reduction in the supplying-end microprocessor, shutting off the voltage comparator in the supplying-end microprocessor 11 directly to make it unable to be triggered within the time period when no data is received and prevent from interfering with data transmission;

(3054) terminating the transmission power recovery check and control program and returning to the master system program;

(3055) restoring to the operating frequency recorded previously to make the output frequency to the power drive unit 12 and amplitudes of the output frequency from the supplying-end coil 171 return to the signal state prior to power pre-reduction;

(3056) shutting off the voltage comparator in the supplying-end microprocessor 11 to prevent noise and system error, eliminating markings for power pre-reduction and proceeding to step (3054).

Referring to FIGS. 14, 15, 16, 17 and 18, when the receiving-end module 2 receives high-power electric energy, the N-type MOSFET component 242 of the amplitude modulation circuit 24 is turned on (high potential of the N-CH MOSFET G pin causes D-S conduction). Therefore, less time for high-potential conduction and trigger can result in less loss. In the present invention, the time for high-potential conduction and trigger (t) is 0.02 mS approximately (according to an example of the preferred embodiments of the present invention, and shall not be construed as limiting the time for conduction and trigger (t), which varies with actual design requirements), and a trigger signal is generated at each time of high-potential conduction (t) calculated at the edge of the trigger. In the receiving-end module 2, the calibrated interval between the first trigger signal (start bit) and the first trigger signal in the next data frame (start bit) is 50 mS (according to an example of the preferred embodiments of the present invention, shall not be construed as limiting the calibrated interval time which may vary with actual design requirements). As subsequent data frames may have different bit lengths (time) as a result of different contents of bytes (logic 0, bit-0 or logic 1, bit-1), the first trigger signal (start bit) is taken as the starting point for calculating time.

In an example of preferred embodiments of the present invention, both the start time and end time of data frames are 2.5 mS. Since data may comprise logic 0 (2 mS) or logic 1 (3 mS), the receiving-end microprocessor 21 of the receiving-end module 2 will begin to receive data signals only after confirming that the start bit length is 2.5 mS, and will receive an end bit signal of 2.5 mS again after having finished receiving the trigger signal (logic 0 and logic 1) for eight times. After the signals (8 triggers) between the start bit and end bit are received completely and flags of the start bit and end bit of 2.5 mS are transmitted successfully, these signals and flags can constitute correct data, thus reducing noise interference to analysis by the supplying-end module 1 in the process of data signal transmission and preventing data from being processed improperly (the above figures or descriptions are intended to illustrate an example of preferred embodiments of the present invention and shall not be construed as constraints over figures or descriptions of the present invention, and they may differ according to actual design requirements)

The timer is also required in the supplying-end microprocessor 11 of the supplying-end module 1 (the timing length may be set as 50 mS or designed in a different way) to predict the time needed for each transmission of data signals, and shall be synchronized with the timer in the receiving-end microprocessor 21 of the receiving-end module 2. If synchronization is implemented at the same time of triggering of the start bit, the timers of the supplying-end module 1 and receiving-end module 2 cannot be synchronized unless the start bit is interpreted correctly.

Figure 18:
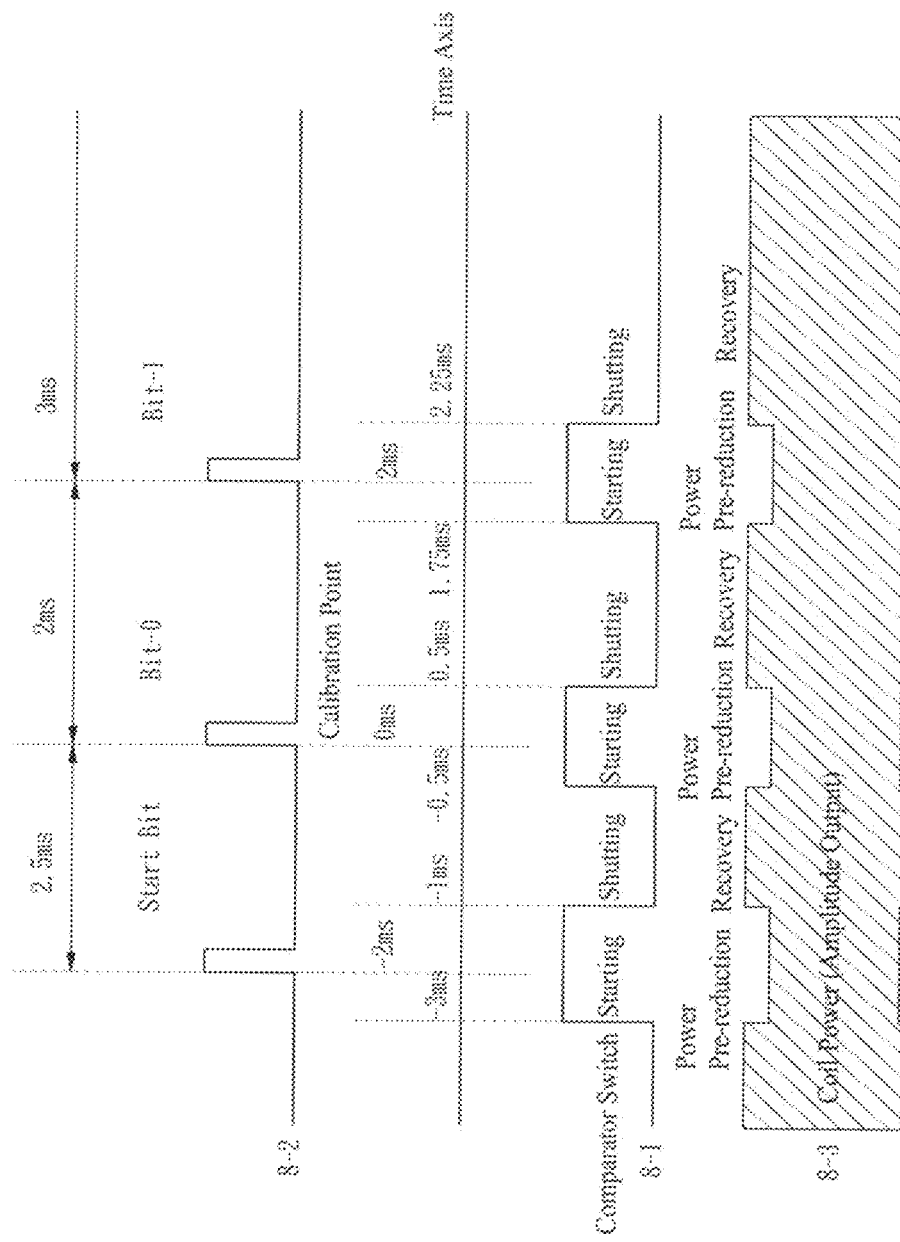
FIG. 18 is a schematic drawing illustrating data signal transmission in accordance with the present invention.
Figure 19:
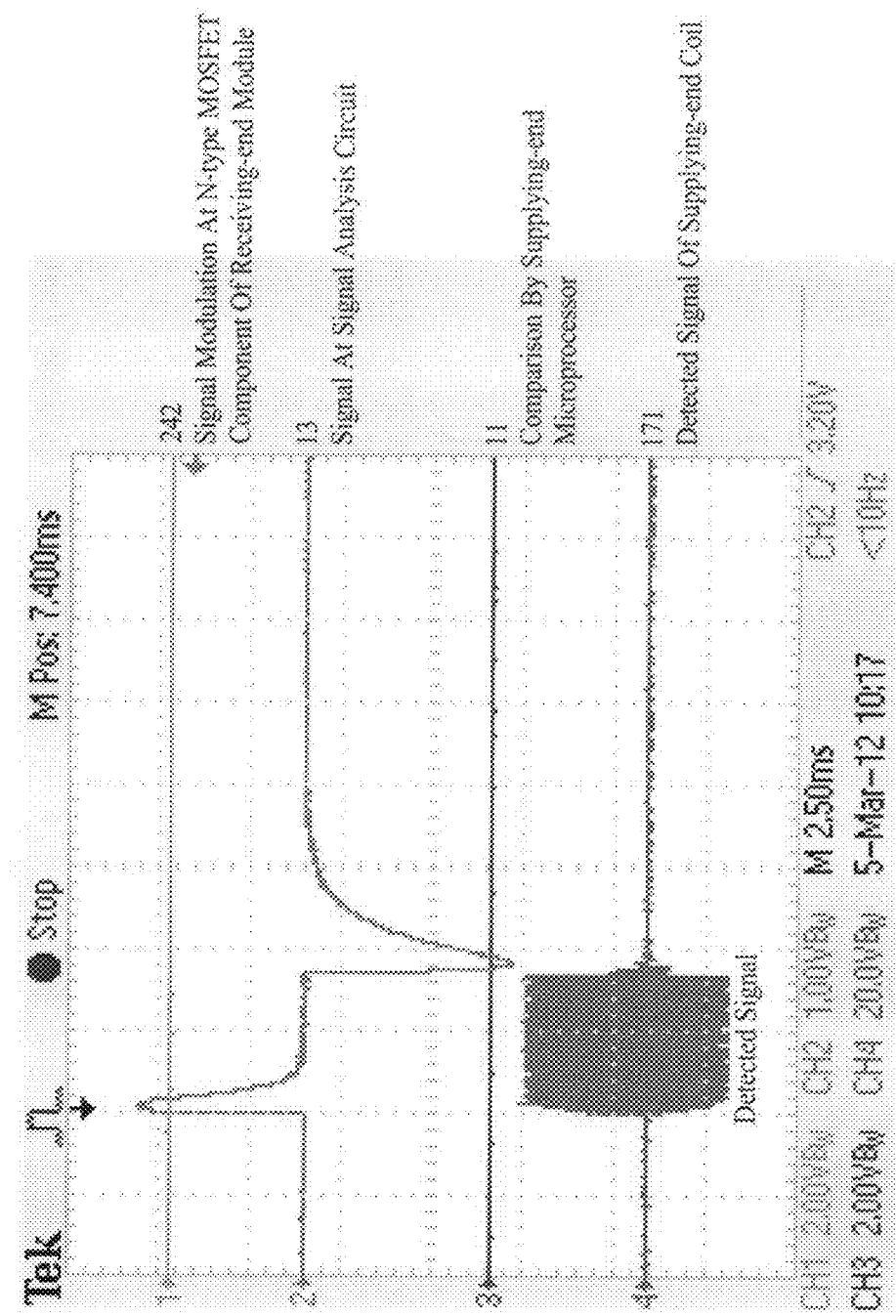
FIG. 19 illustrates a signal during detection of the supplying-end module in accordance with the present invention.
Figure 20:
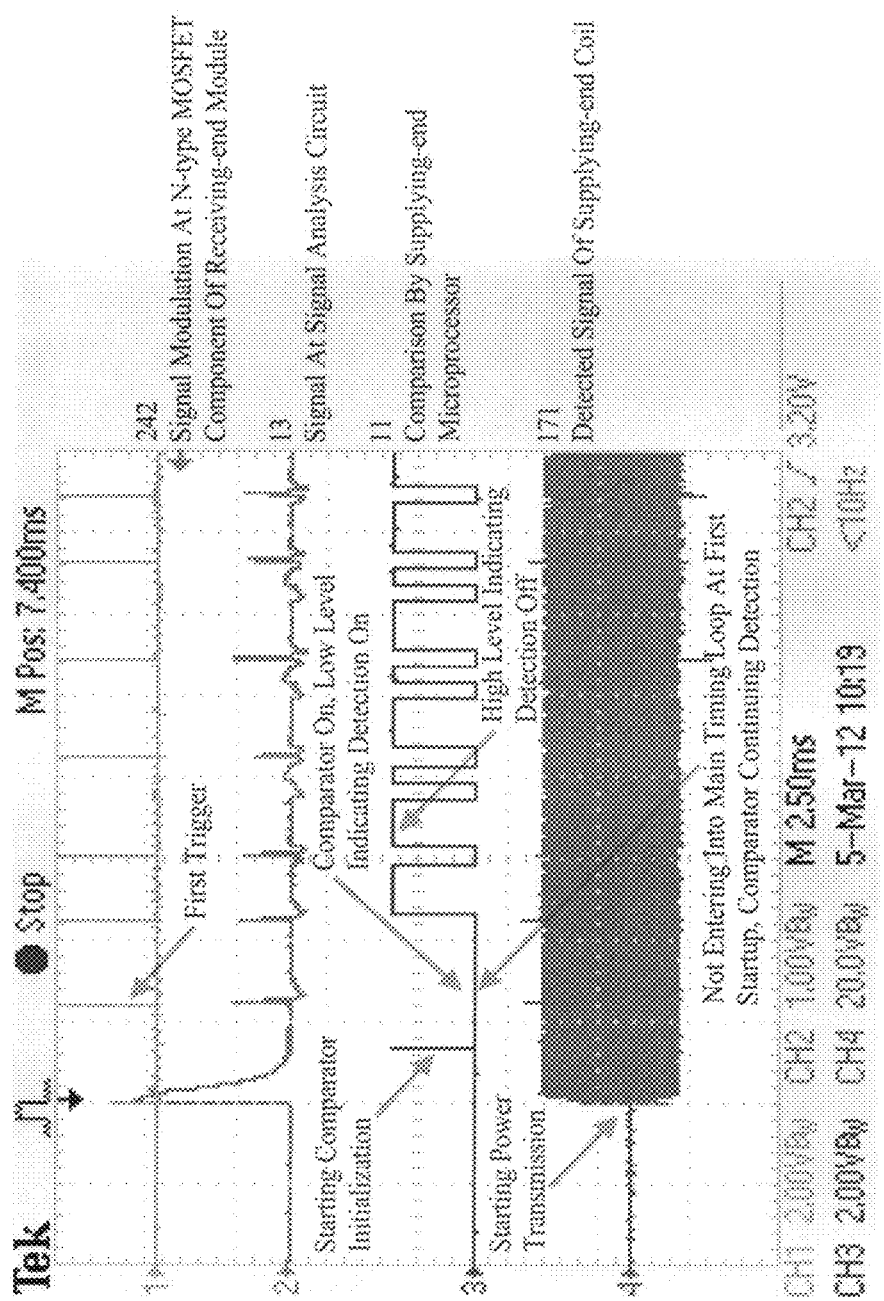
FIG. 20 illustrates a signal indicating extended power transmission after the supplying-end module detects the trigger signal from the receiving-end module in accordance with the present invention.
Figure 21:
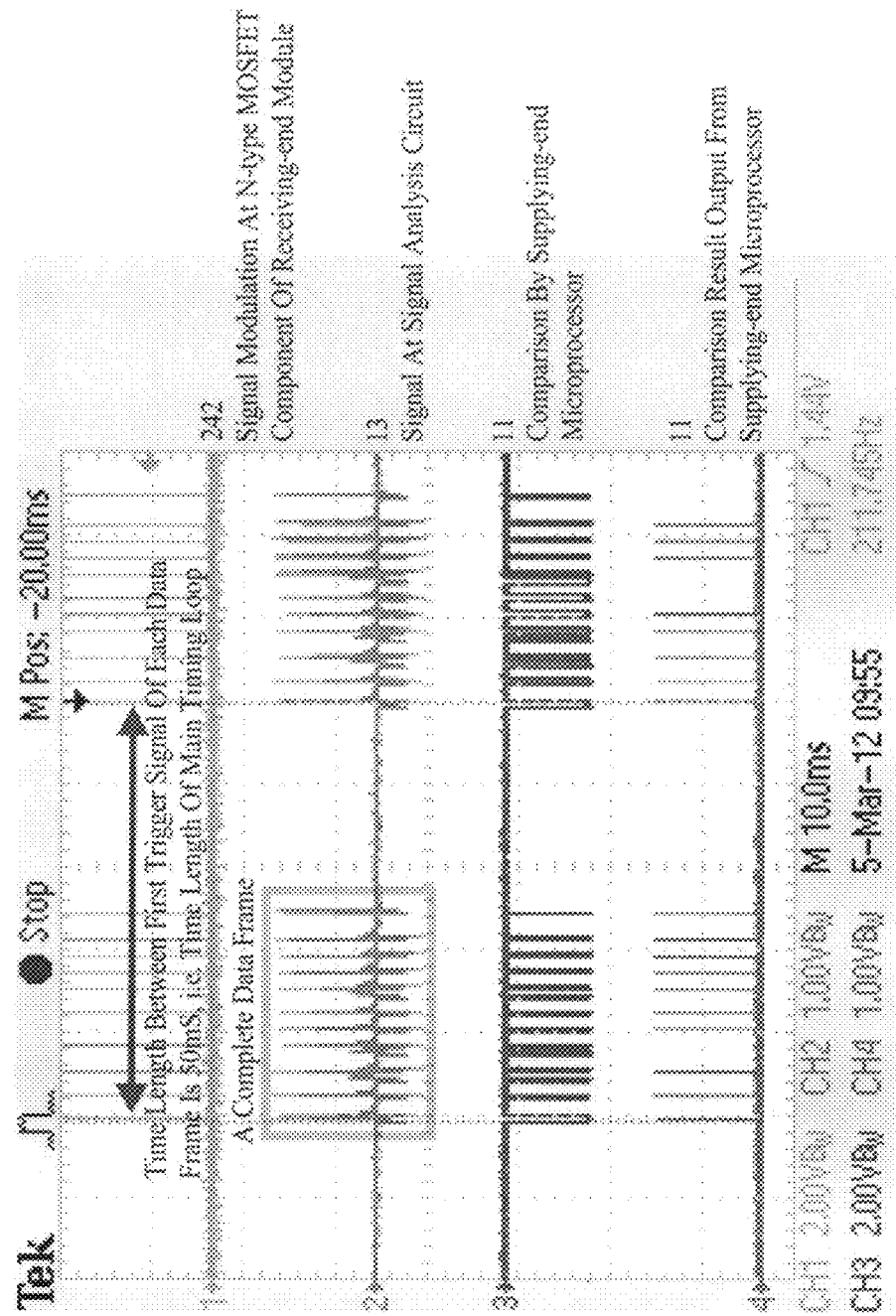
FIG. 21 illustrates a signal in a data frame (main loop gap) during power transmission in accordance with the present invention.
Figure 22:
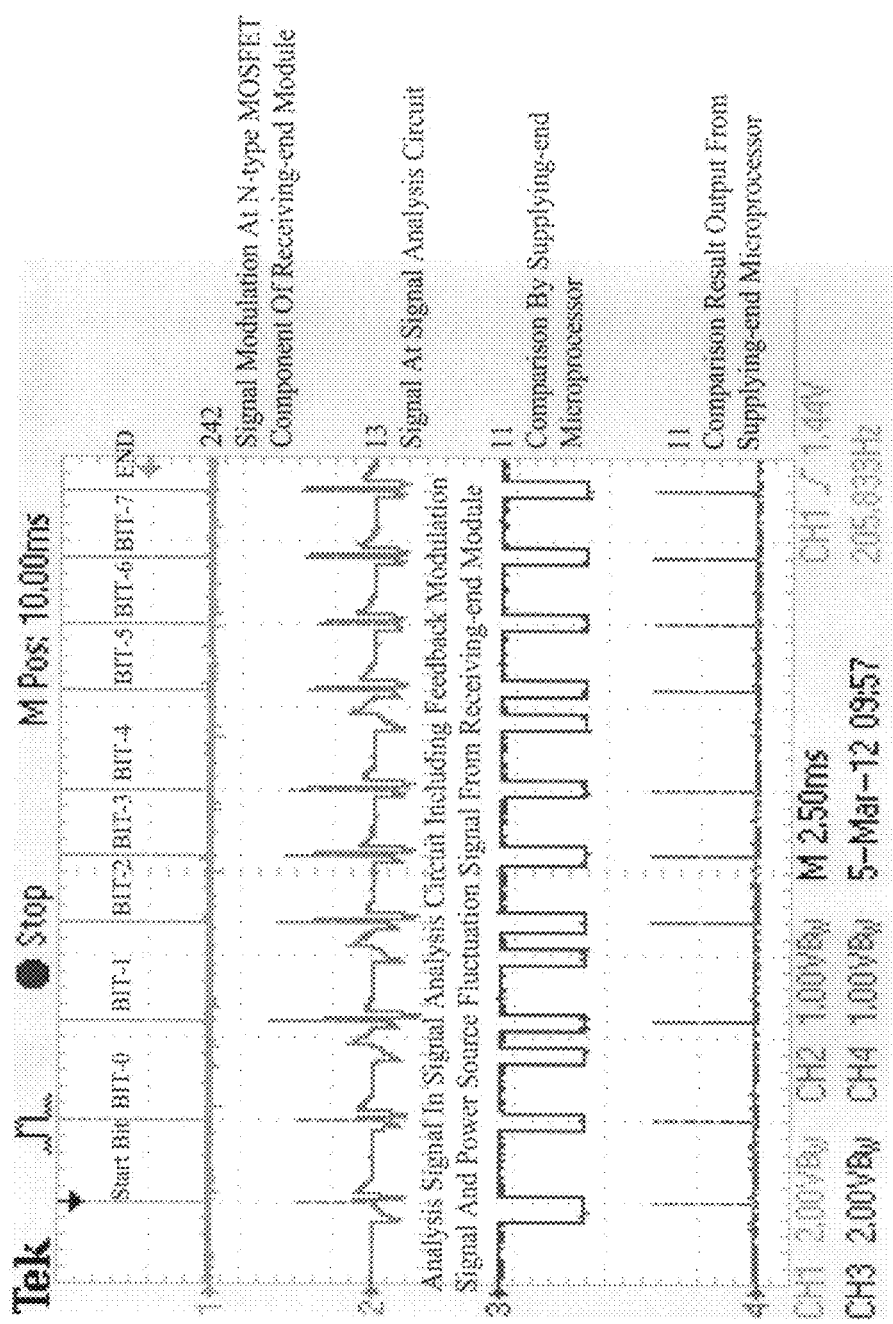
FIG. 22 illustrates a signal of data frame contents in accordance with the present invention.
Figure 23:
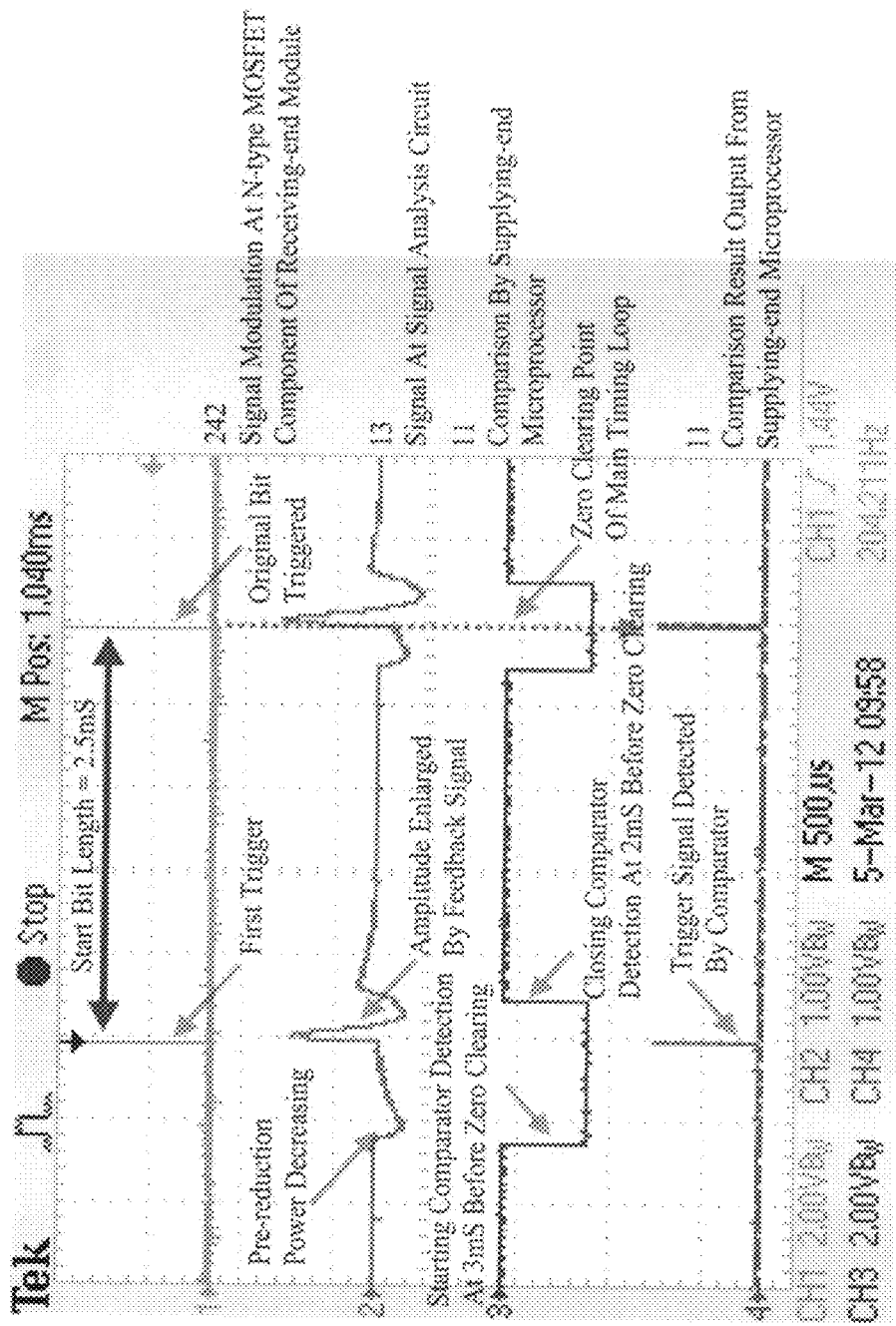
FIG. 23 illustrates a signal of the start bit length in a data frame in accordance with the present invention.
Figure 24:
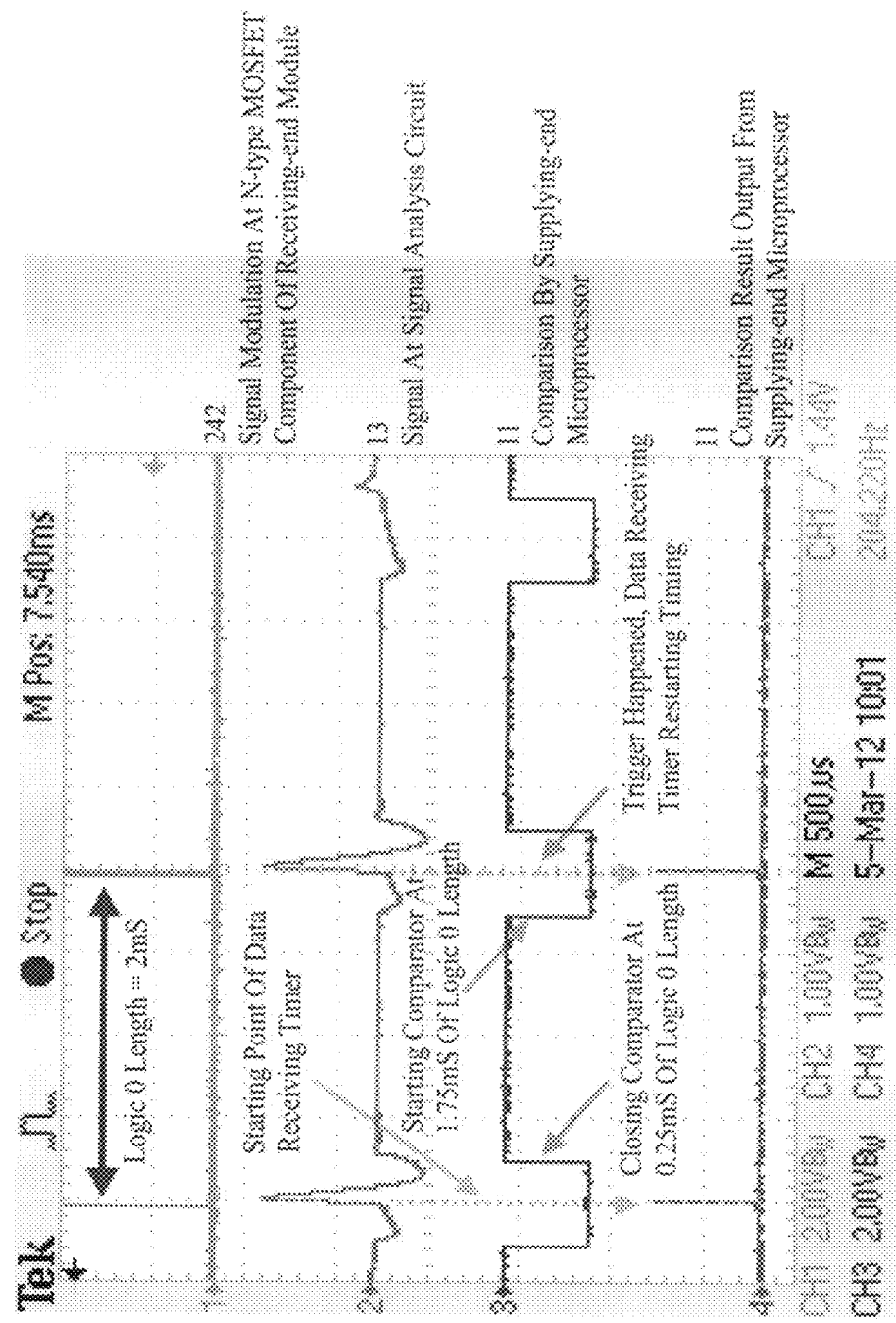
FIG. 24 illustrates a signal of logic 0 bit length in the data frame in accordance with the present invention.
Figure 25:
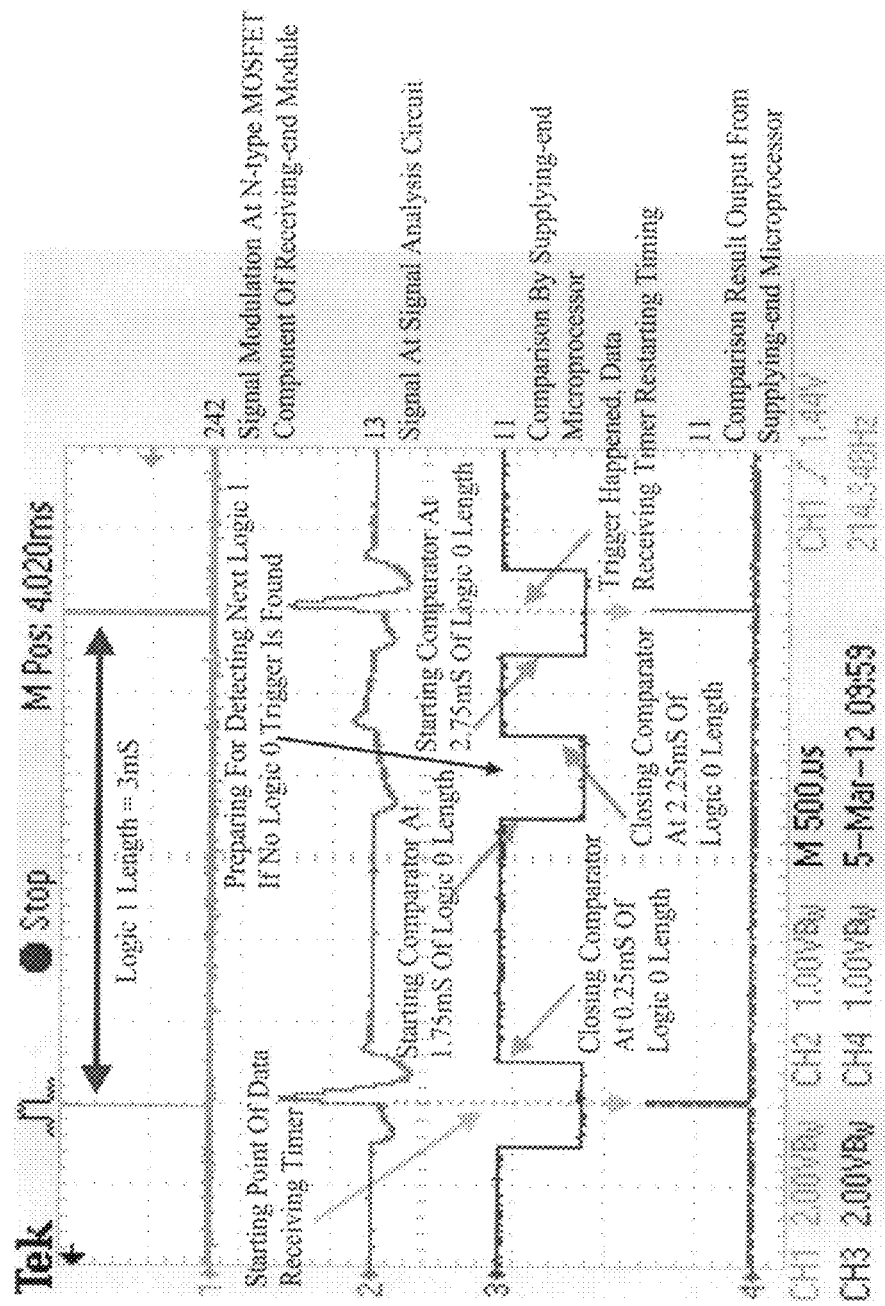
FIG. 25 illustrates a signal of logic 1 bit length in the data frame in accordance with the present invention.
Figure 26:
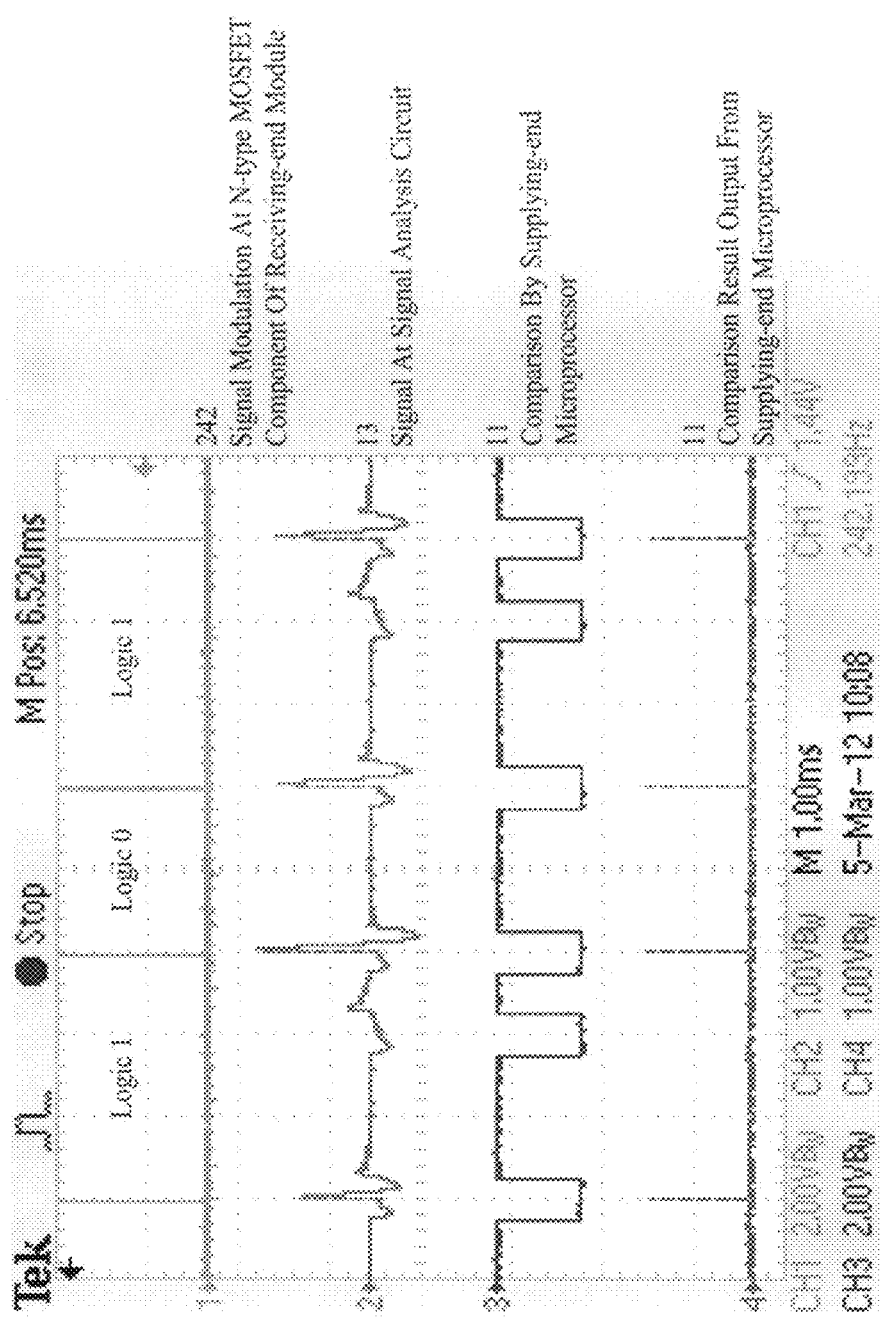
FIG. 26 illustrates a signal of transmission bit content in the data frame in accordance with the present invention.
Figure 27:
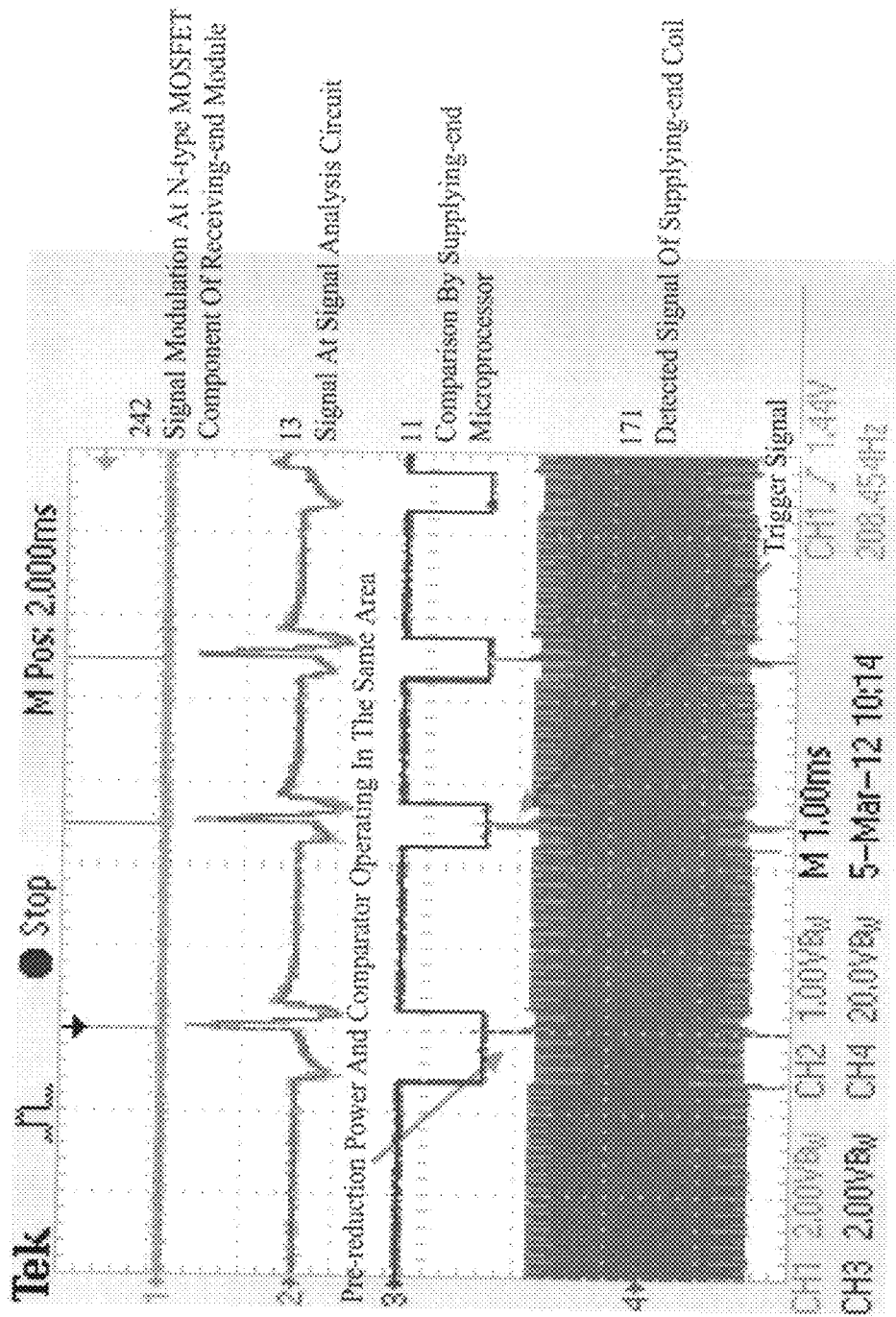
FIG. 27 is a presentation of power pre-reduction of the supplying-end coil signals in accordance with the present invention (1).
Figure 28:
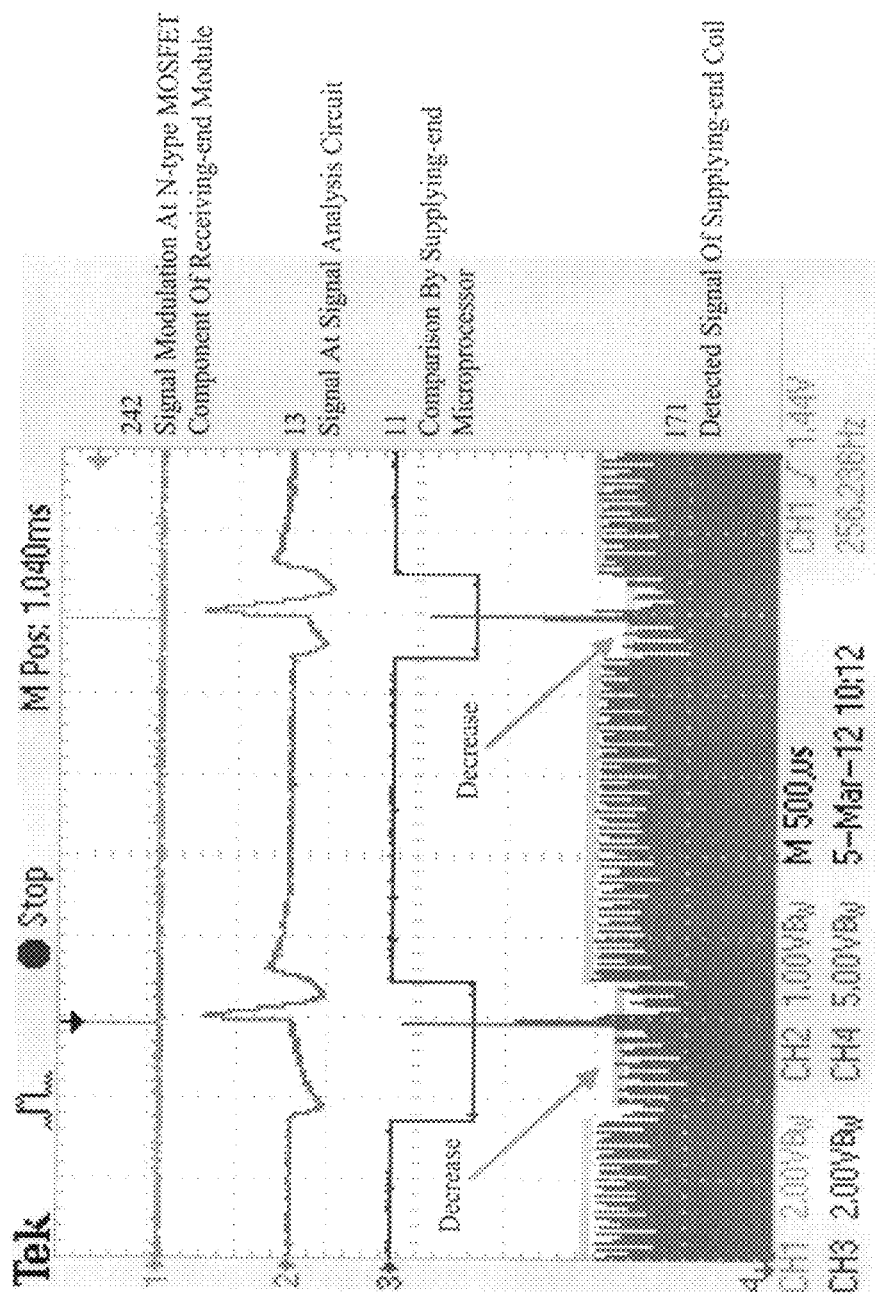
FIG. 28 is a presentation of power pre-reduction of the supplying-end coil signals in accordance with the present invention (2).
Figure 29:
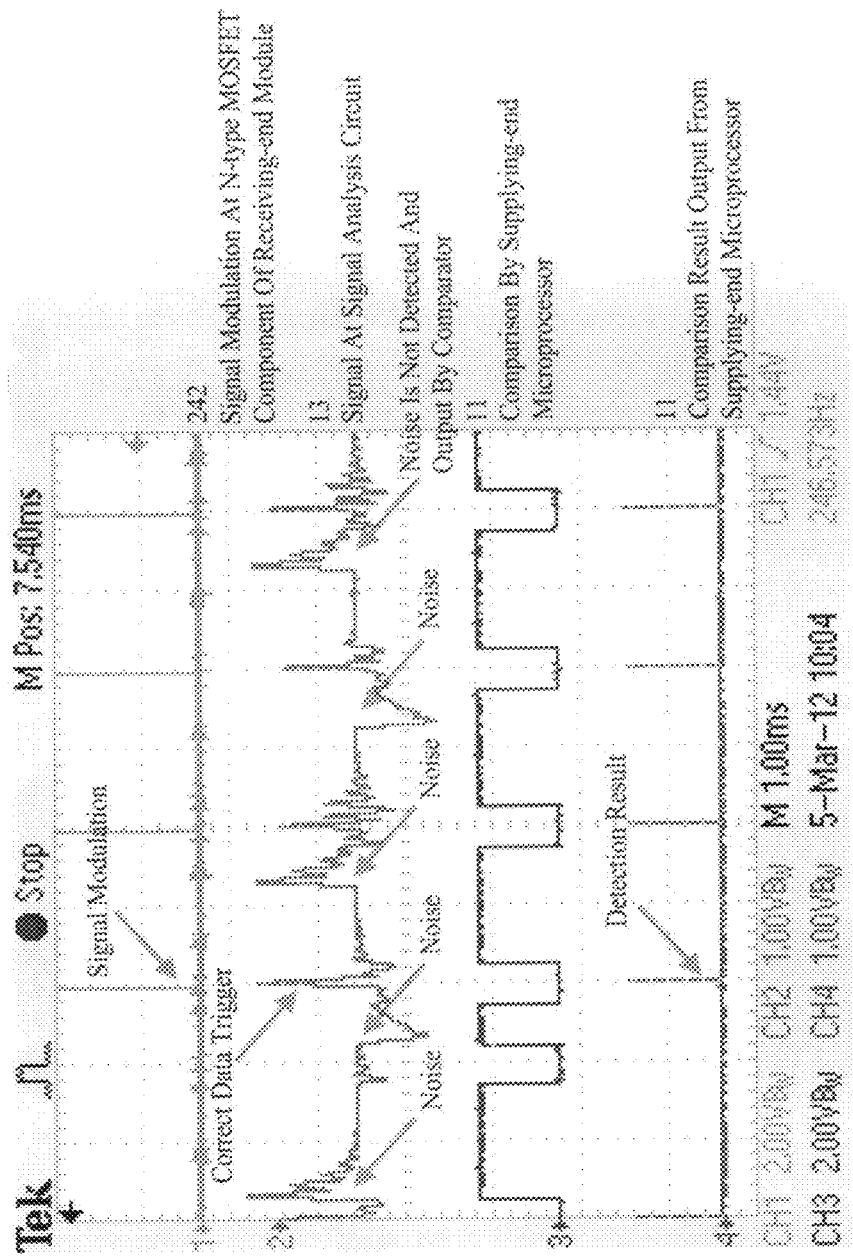
FIG. 29 illustrates a signal processed with anti-noise method in accordance with the present invention.
Figure 30:
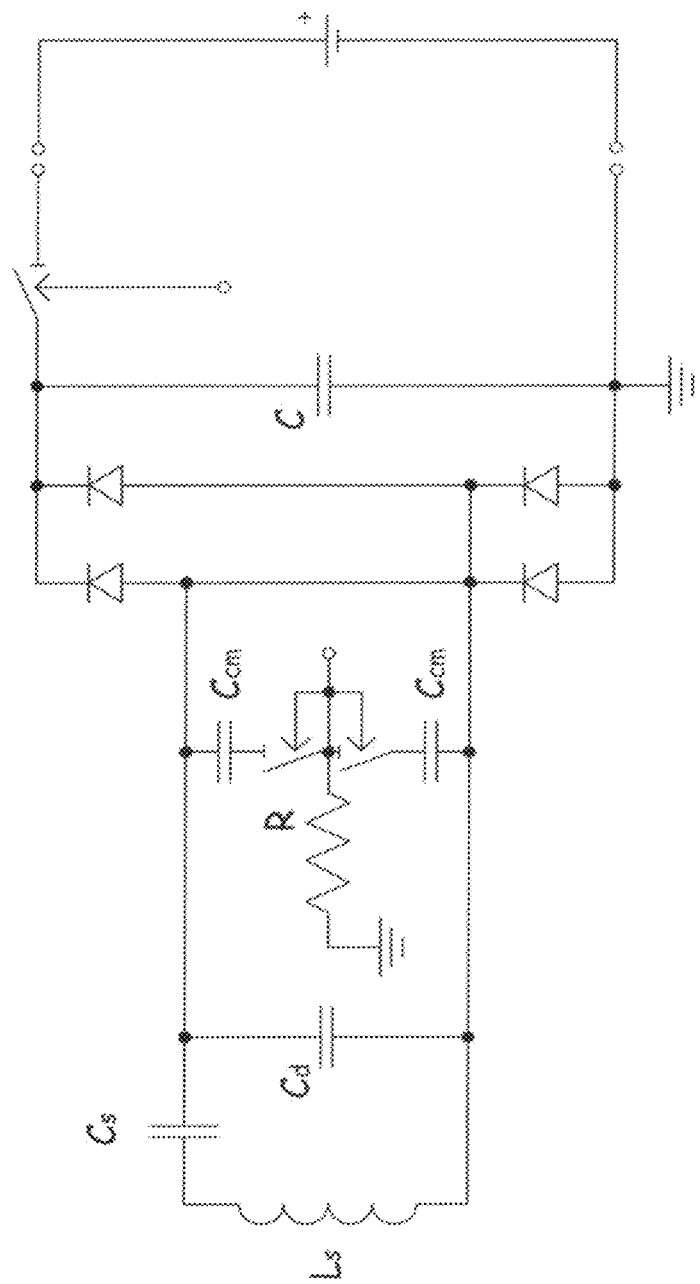
FIG. 30 is a schematic circuit diagram of the structure of receiving power and feedback by the receiving-end module according to conventional Qi specifications (1).
Figure 31:
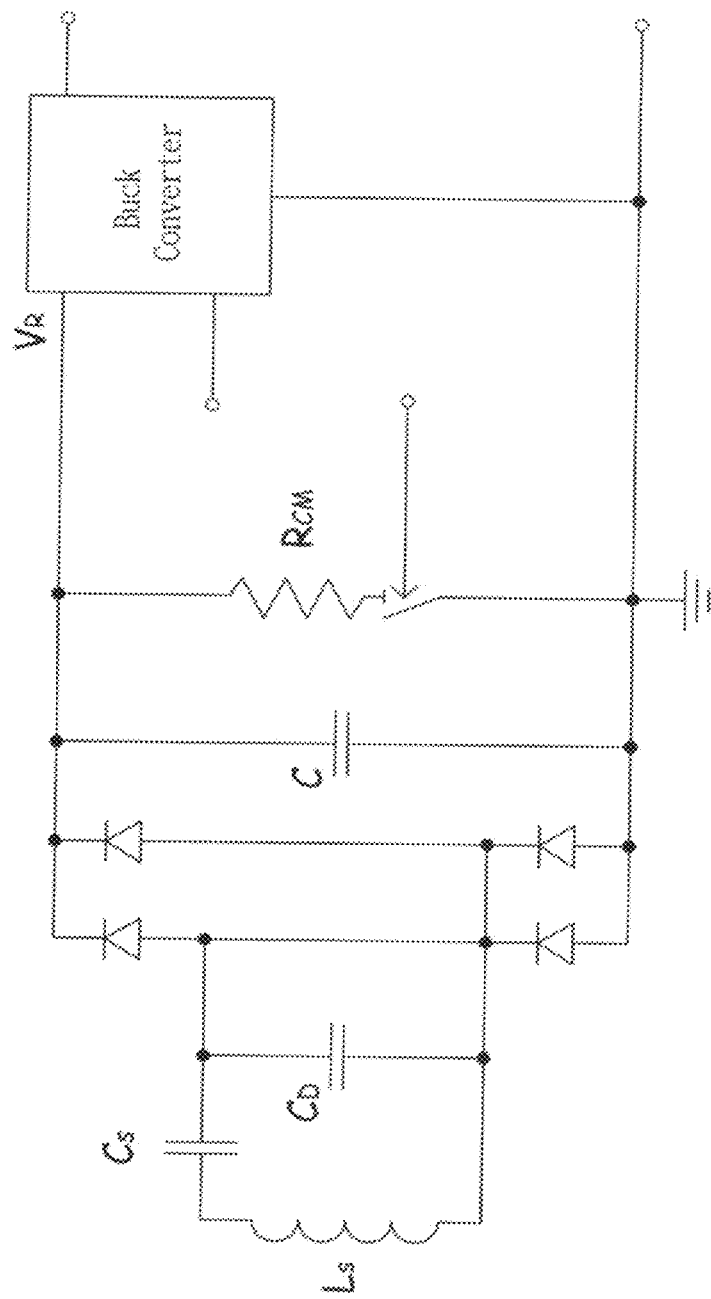
FIG. 31 is a schematic circuit diagram of the structure of receiving power and feedback by the receiving-end module according to conventional Qi specifications (2).
Figure 32:
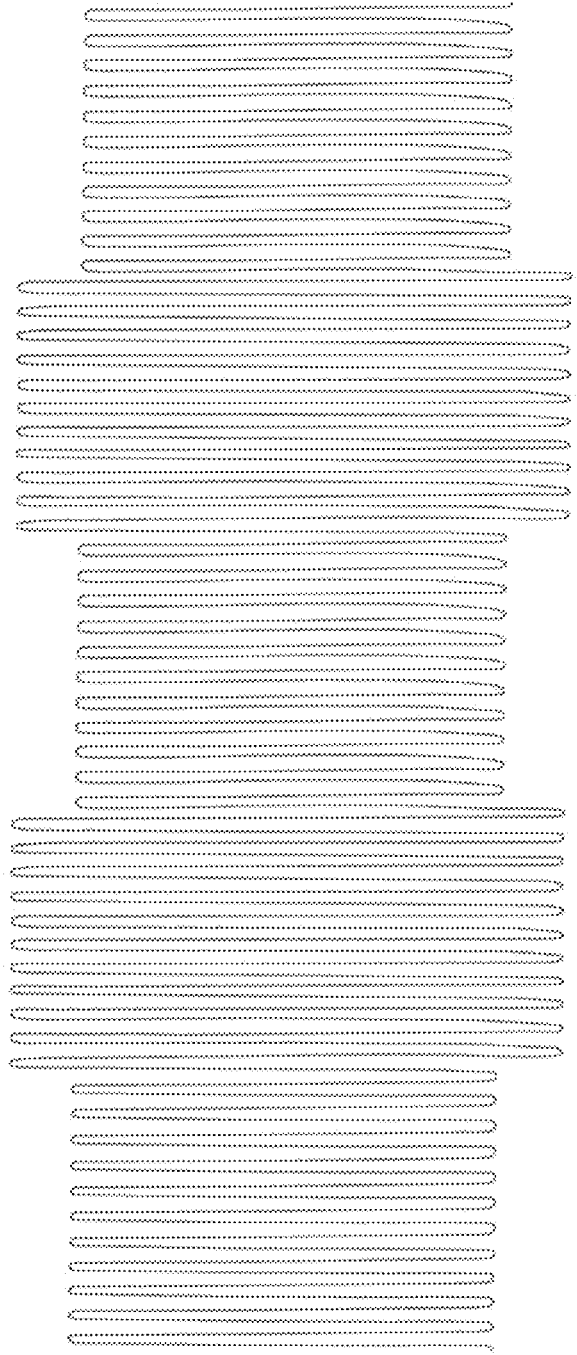
FIG. 32 illustrates a signal in a conventional induction type power supply system disclosed in US Patent Publication No. 20110273138 (1).
Figure 33:
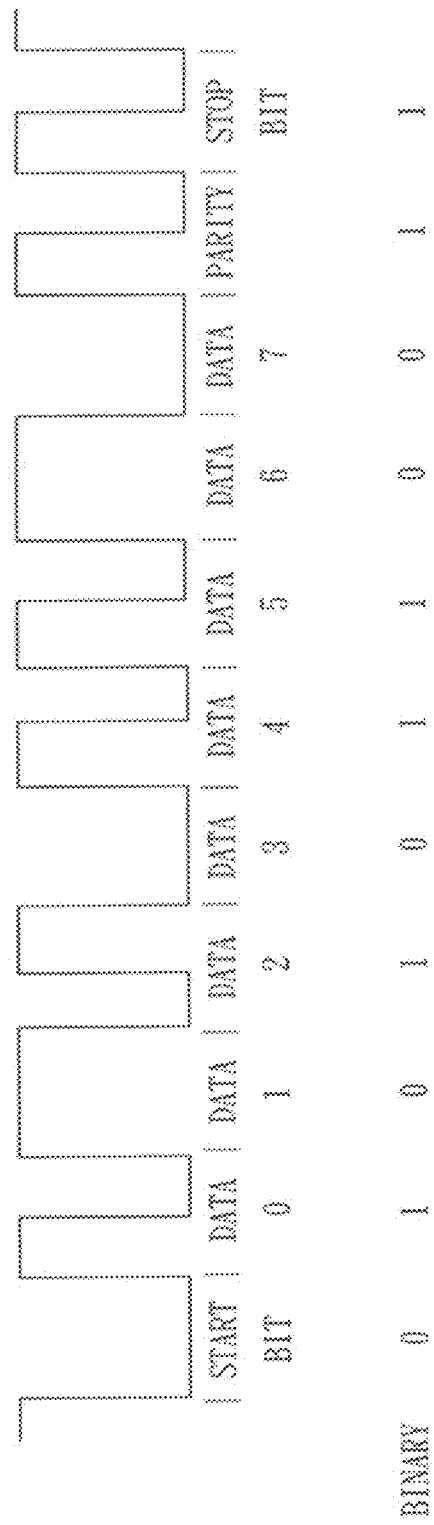
FIG. 33 illustrates the signal in a conventional induction type power supply system disclosed in US Patent Publication No. 20110273138 (2).
Figure 34:
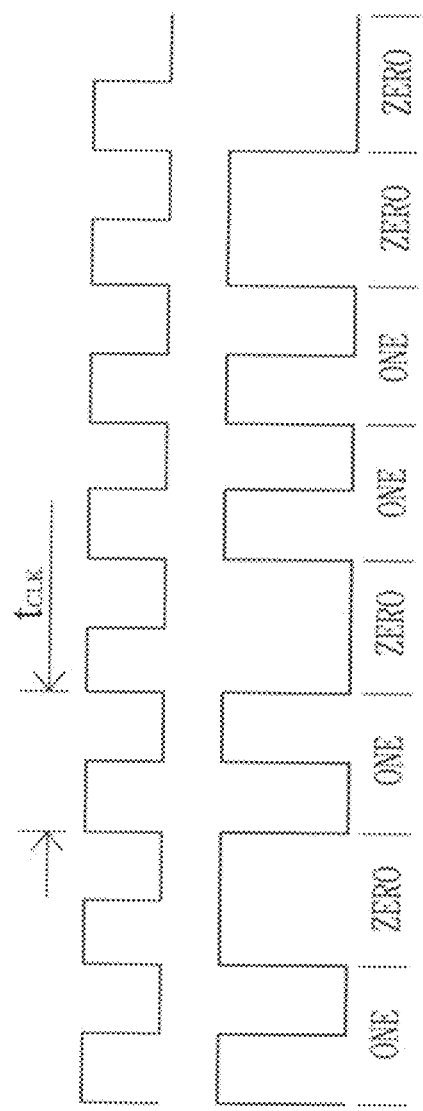
FIG. 34 illustrates the data transmission format according to the conventional Qi specifications (1).
Figure 35:
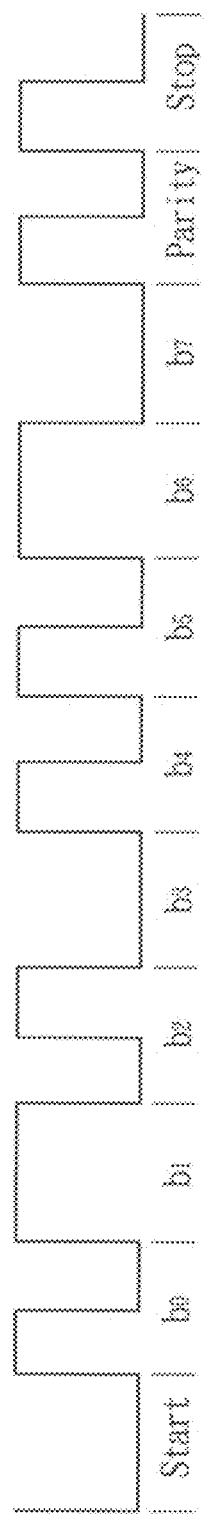
FIG. 35 illustrates the data transmission format according to the conventional Qi specifications (2).
Figure 36:
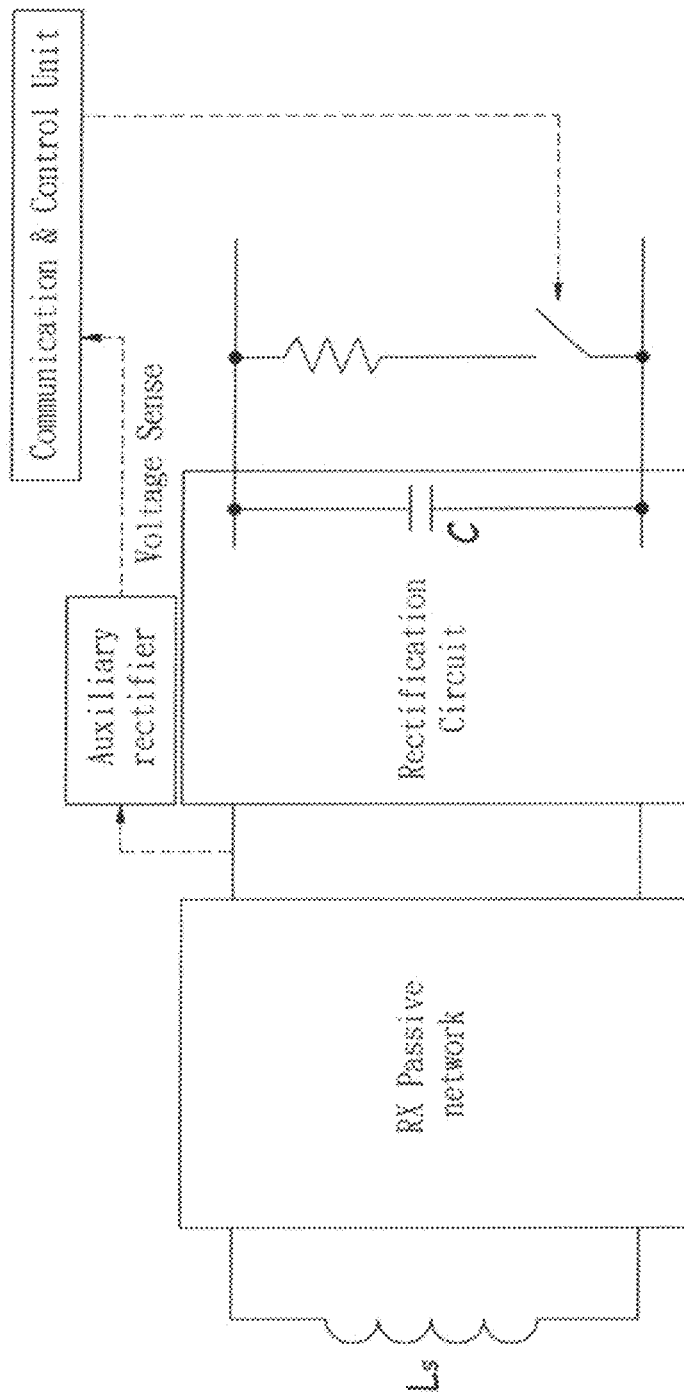
FIG. 36 is a schematic circuit diagram of data modulation and demodulation in the wireless power transfer disclosed in US Patent Publication No. 20110065398 (1).
Figure 37:
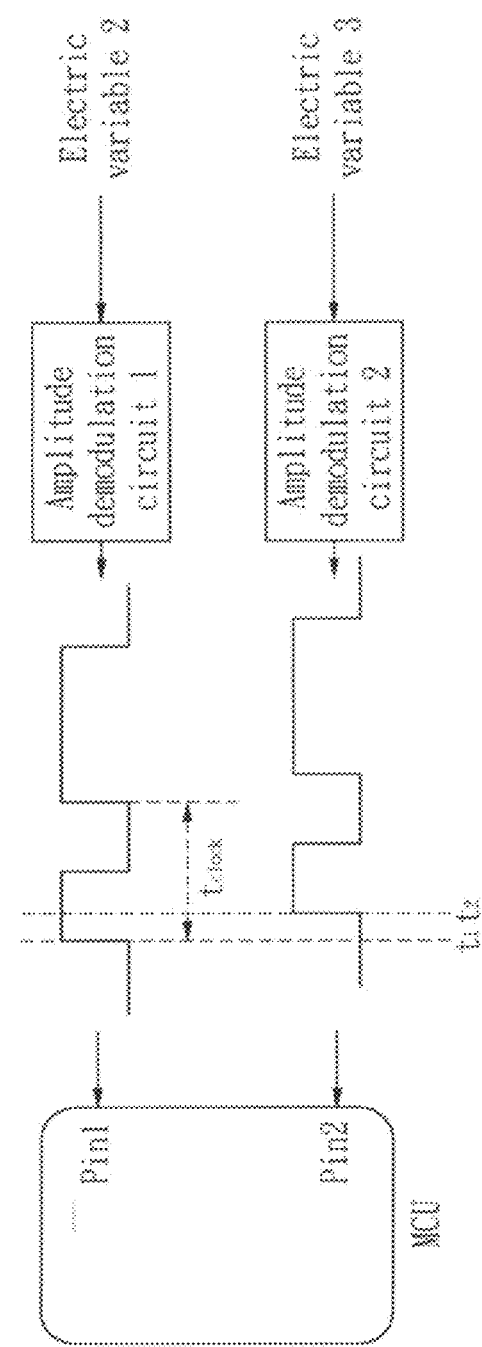
FIG. 37 is a schematic circuit diagram of data modulation and demodulation in the wireless power transfer disclosed in US Patent Publication No. 20110065398 (2).
Figure 38:
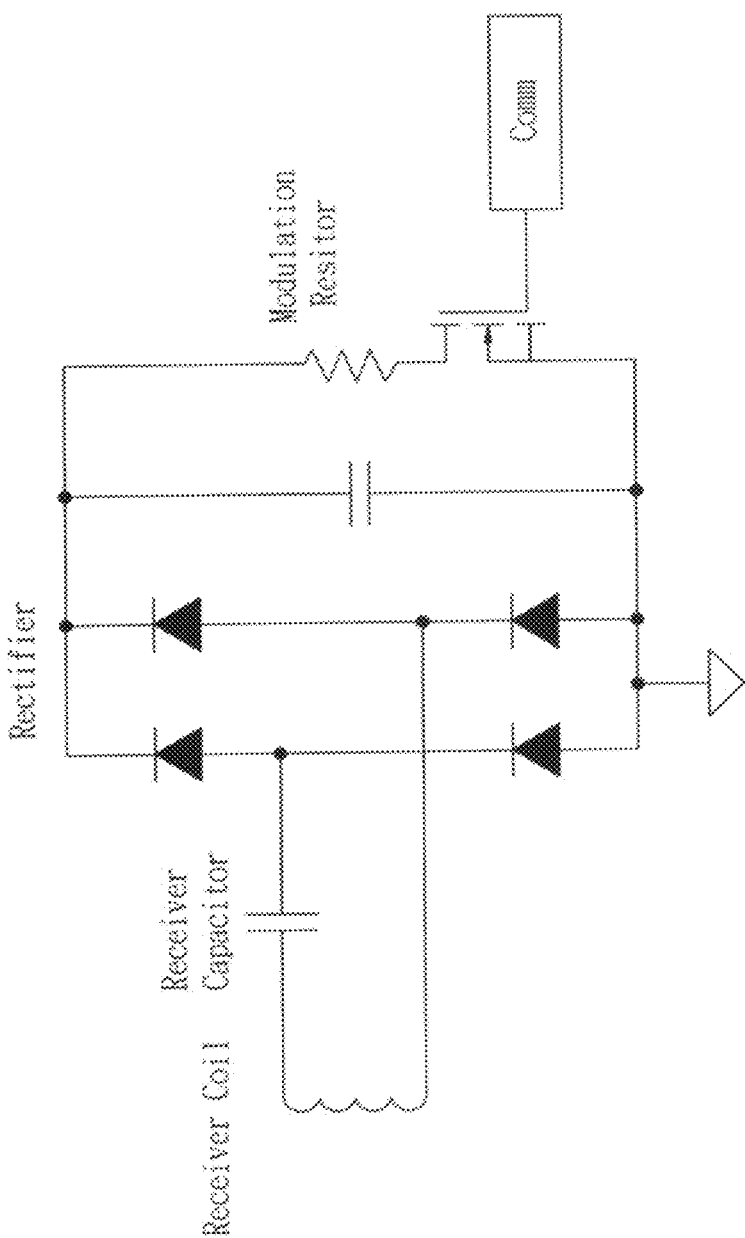
FIG. 38 is a circuit diagram of resistor type signal modulation in conventional Ti specifications.
Figure 39:
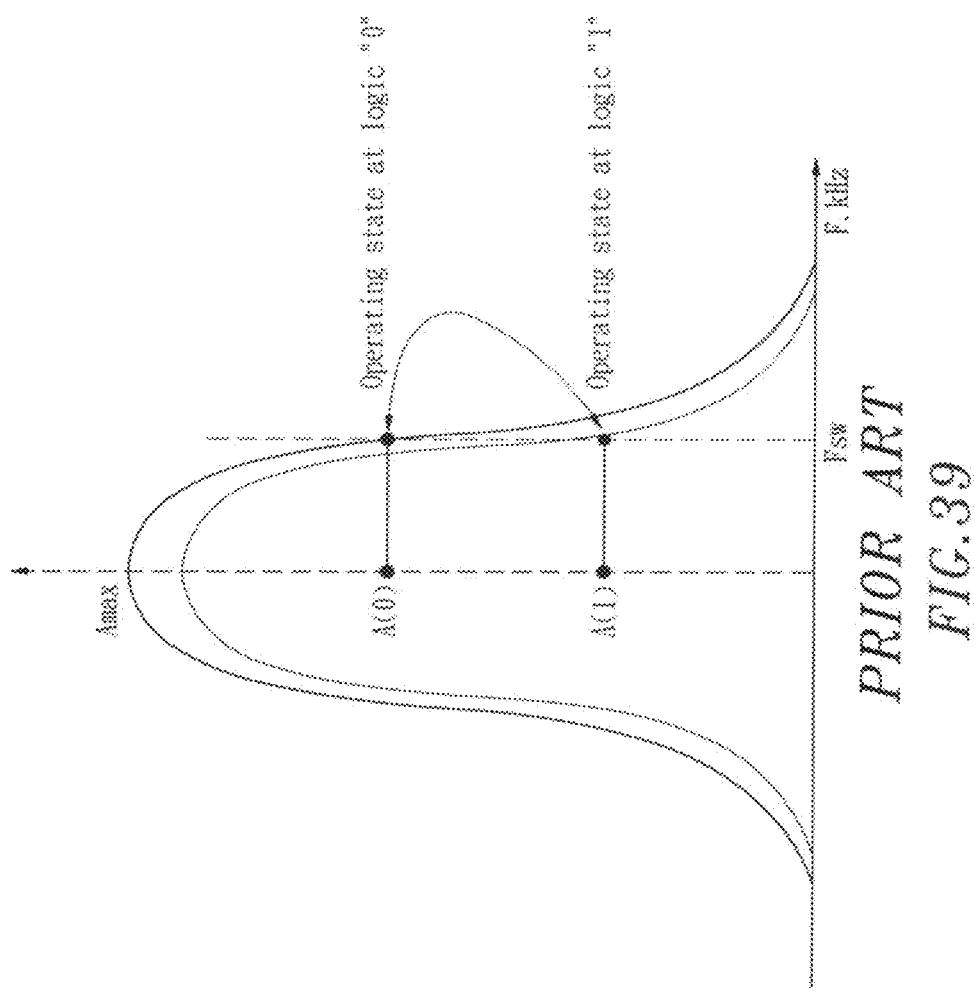
FIG. 39 is a waveform of resistor type signal modulation in conventional Ti specifications.
Figure 40:
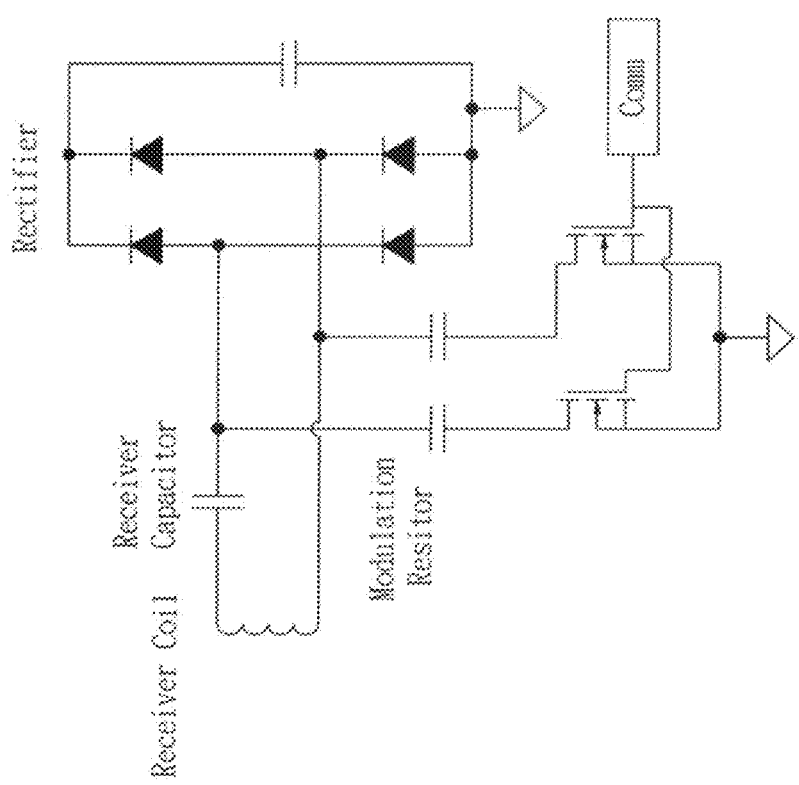
FIG. 40 is a circuit diagram of capacitor type signal modulation in conventional Ti specifications.
Figure 41:
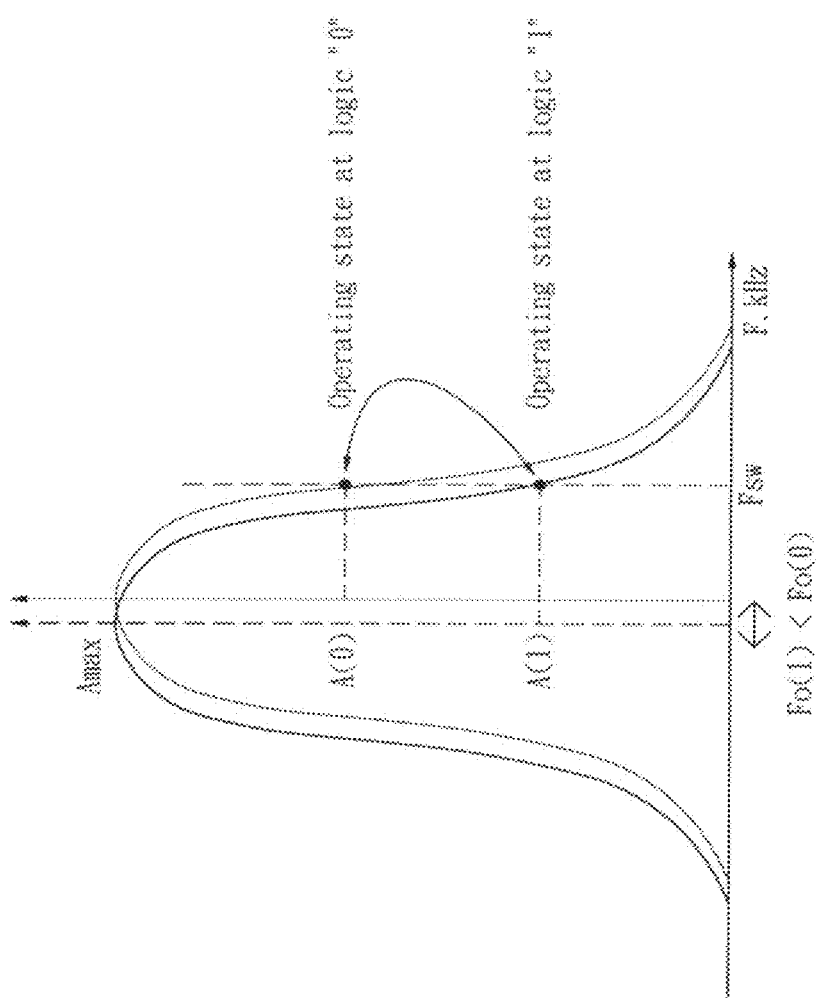
FIG. 41 is a waveform drawing of capacitor type signal modulation in conventional Ti specifications.
Figure 42:
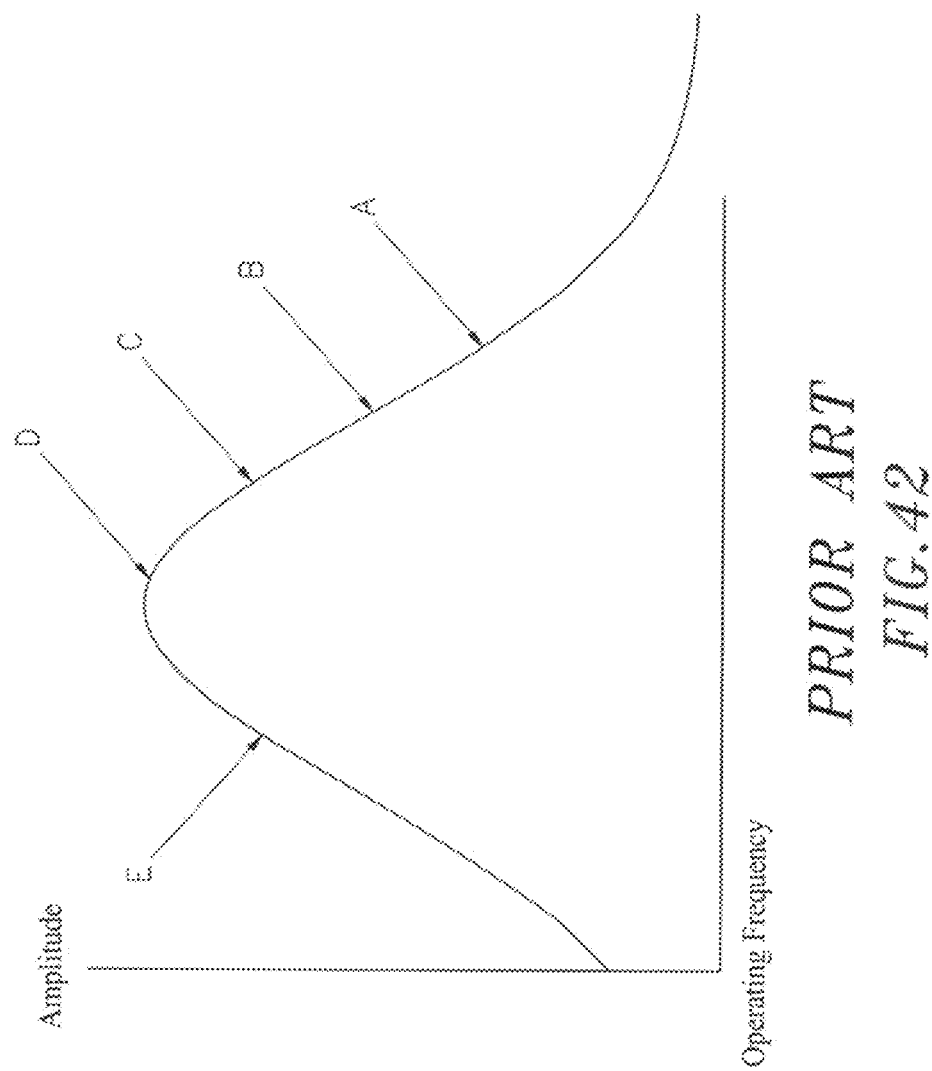
FIG. 42 is a chart illustrating waveform amplitude variation at data signal modulation point.

After the timers of the supplying-end module 1 and receiving-end module 2 are synchronized, the supplying-end module 1 (refer to the No. 8-1 curve in FIG. 18) may start the comparator for detecting signals just before data is transmitted from the receiving-end module 2 (refer to the No. 8-2 curve in FIG. 18). Besides, the power output from the supplying-end module 1, if considerably high (refer to the No. 8-3 section in FIG. 18), may be reduced in advance to facilitate trigger signal transmission from the receiving-end module 2. However, the time of power reduction is very short (roughly 0.25 mS to 0.5 mS), and the section occurring on the receiving-end module 2 where transmission power reduces will be buffered by the buffer capacitor 261 of the voltage stabilizing circuit 26, thus preventing data signal output from the receiving-end module 2 from being affected.

It should be noted that the above descriptions are given to illustrate examples of preferred embodiments of the present invention and shall not be construed as limiting the appended patents claims of the present invention. In the present invention, the method of time-synchronized data transmission in induction type power supply system achieves transmission of power from the supplying-end microprocessor 11 of the supplying-end module 1 to the receiving-end coil 281 of the receiving-end module 2 and feedback of data signals from the receiving-end coil 281 to the supplying-end coil 171 of the supplying-end module 1 by using the timers embedded in the supplying-end microprocessor 11 and receiving-end microprocessor 21 to synchronize timing and receiving trigger signals, thus enabling data signals to be stably transmitted synchronously while the supplying-end module 1 transmits power. So it can achieve the purpose of reducing transmission loss of data signals without affecting power transmission between the supplying-end module 1 and the receiving-end module 2. In one embodiment, the supplying-end microprocessor 11 of the supplying-end module 1 reduces the power to facilitate data transmission during high power transmission and restores the original power following data signal transmission, with the advantage of increasing the maximum transmission power of induction type power supply systems. Thus, the present invention can also achieve the utility function to synchronize charging and stable transmission of data signals. It is hereby stated that processes, embodiments, devices or configurations, etc. that can achieve said effect shall be covered by the present invention, and that all modifications and equivalent structural changes shall be included in the appended patent claims of the present invention.

In practical applications, the method of time-synchronized data transmission in induction type power supply system has the advantages as follows:

(1) both the supplying-end microprocessor 11 and the receiving-end microprocessor 21 includes a timer used to synchronize timing and predict the time for triggering data signals, so as to achieve high-power transmission of electric energy and stable transmission of data signals;

(2) the supplying-end microprocessor 11 can coordinate with the trigger time of the receiving-end microprocessor 21 to reduce high-power electric energy in advance during data transmission and restore the original power following completion of data transmission, without affecting transmission of electric power and data due to power reduction and increase in short period of time.

Therefore, the present invention relates to the method of time-synchronized data transmission in induction type power supply system. It uses the timers installed in the supplying-end microprocessor of the supplying-end module and receiving-end microprocessor of the supplying-end module for synchronization when data signals are fed from the receiving-end module to the supplying-end module, thus achieving stable and synchronous transmission of power and data signals between the receiving-end module and supplying-end module and stabilizing system operation for power transmission. However, all the above descriptions are given to illustrate an example of preferred embodiments of the present invention and shall not be construed as limiting the patent claims of the present invention. It is hereby stated that all modifications and equivalent principle changes made according to these descriptions and drawings shall be included in the appended patent claims of the present invention.

In summary, the method of time-synchronized data transmission in induction type power supply stem as disclosed in the present invention can achieve its functions and objects when applied practically. Therefore, the present invention is really an excellent one with practical applicability and can satisfy the terms and conditions for patentability of a utility model. While the application of patent is filed pursuant to applicable laws, your early approval will be highly appreciated so as to guarantee benefits and rights of the inventor who has worked hard at this invention. For any question, please do not hesitate to inform the inventor by mail, and the inventor will try his best to cooperate with you.

What the invention claimed is:

1. A method of time-synchronized data transmission in induction type power supply system to achieve transmission of data signals and power between a supplying-end module used to transmit power and a receiving-end module used to feed back data signals, the method comprising the steps of:

(a) starting program initialization by a supplying-end microprocessor and setting timing length of trigger pulse, start bit, logic state, end bit and data transmission loop and other functions following transmission of power from a power source of the supplying-end module;

(b) setting detection signal output frequency by the supplying-end microprocessor with frequency converter program to stop output frequency to a power driver unit;

(c) starting a standby timer by the supplying-end microprocessor and entering into sleeping and power-saving state after shutting down the output, and waking up upon completion of timing;

(d) starting and transmitting the detection signal upon completion of standby timing to activate the receiving-end module close to the supplying-end coil and then starting a voltage comparator installed in the supplying-end microprocessor;

(e) starting to count detection time and detecting if there is a trigger signal on signal analysis circuit with the voltage comparator in the supplying-end microprocessor; proceeding to step (h) if there is no trigger signal; otherwise, proceeding to step (f);

(f) deciding that there is no receiving-end module close to the supplying-end module if no trigger signal is found in the detection period and preparing to enter into standby mode;

(g) detecting the signal from the coil voltage detection circuit in the supplying-end microprocessor and checking if the voltage falls within the set range; proceeding to step (b) to reset the detection signal output frequency if the voltage does not fall within the set range; otherwise, proceeding to step (c) and shutting off the output;

(h) transmitting a trigger signal from the timer to examine signal check flag and determine if a first trigger signal is delivered, proceeding to step (i) if not, otherwise proceeding to step (k);

(i) deciding that the receiving-end module gets close to the supplying-end coil according to the first trigger signal and extending the detection signal transmission time to continuously transmit power to the receiving-end module through the supplying-end coil and make it operate;

(j) marking the signal check flag as an issued trigger signal, starting the trigger signal timer to get ready for detecting the next trigger and proceeding to step (e);

(k) sending a trigger signal from the time of the supplying-end microprocessor and checking if the start bit length is confirmed; proceeding to step (l) if the start bit length is not confirmed; otherwise, proceeding to step (m);

(l) checking if the issue time of the current signal and time length of the first trigger signal conform with the range of the start bit length; proceeding to step (m) if yes, and proceeding to step (n) if not;

(m) marking the start bit flag as confirmation completed, resetting and restarting the trigger signal timer to get ready for detecting the next trigger;

(n) deciding that no desired receiving-end module is getting close by the supplying-end module if the start bit signal length does not comply with the set value, getting ready for shutting down the output and proceeding to step (f).

2. The method of time-synchronized data transmission in induction type power supply system according to claim 1, wherein the supplying-end module comprises a supplying-end microprocessor, which is electrically connected with an power drive unit, a signal analysis circuit, a coil voltage detection circuit, a display unit, a power supply unit and a grounding terminal respectively; the power drive unit is electrically connected with a resonant circuit, and the resonant circuit, the signal analysis circuit and the coil voltage detection circuit are respectively and electrically connected with a supplying-end coil able to transmit power signals.

3. The method of time-synchronized data transmission in induction type power supply system according to claim 1, wherein the receiving-end module comprises a receiving-end microprocessor, which is electrically connected with a voltage detection circuit, a breaker protection circuit, a voltage stabilizing circuit, an amplitude modulation circuit and a direct current step-down transformer respectively; the breaker protection circuit, the direct current step-down transformer and the voltage detection circuit are respectively and electrically connected with a rectifier and filter circuit respectively, and the rectifier and filter circuit and amplitude modulation circuit are further respectively connected with a resonant circuit and a receiving-end coil.

4. The method of time-synchronized data transmission in induction type power supply system according to claim 1, wherein after receiving the power from the supplying-end module in step (i), the receiving-end module proceeds the following steps:
- (i01) receiving the startup power from the supplying-end module, starting the initialization program and setting the timing length of the trigger pulse, start bit, logic state, end bit and data transmission loop;
- (i02) converting terminal analog voltage of a resistor in the receiving-end microprocessor into numerical value and transmitting the numerical value to a transmitted (Tx) data buffer in the receiving-end microprocessor of the receiving-end module for a first time;
- (i03) measuring the data transmission loop timing length by time and setting it as a timing start point;
- (i04) transmitting a first trigger pulse and starting timing of the start bit length;
- (i05) completing the timing of the start bit length, transmitting the data in Tx data buffer and setting the number of bits inside as Tx data bits;
- (06) rotating the bits in Tx data buffer and reading out the least significant bit (LSB) for logic decision through internal instructions in the receiving-end microprocessor and adding one count to data counter;
- (i07) judging the logic state; proceeding to step (i08) if the logic state is 0, or proceeding to step (09) if the logic state is 1;
- (i08) transmitting the trigger pulse; if the logic state is decided to be 0, starting timing of the logic 0 length and proceeding to step (i10);
- (i09) transmitting the trigger pulse; if the logic state is decided to be 1, starting timing of the logic 1 length and proceeding to step (i10);
- (i10) terminating timing and checking if the number displayed on the data counter is equal to that of data bits; proceeding to step (i11) if yes, and proceeding to step (i06) if not;
- (i11) completing transmission of data bits, transmitting a trigger pulse and starting timing of end bit length;
- (i12) finishing timing of the end bit length and transmitting a trigger pulse as a last trigger identification signal in the data transmission;
- (13) converting the terminal analog voltage of the resistor in the receiving-end microprocessor into numerical value and transmitting the numerical value to the Tx data buffer in the receiving-end microprocessor;
- (i14) waiting for timing of the data transmission loop to be completed, so that the first trigger pulse can match the set length and proceeding to step (i03) before the start bit is transmitted in every data transmission.

5. The method of time-synchronized data transmission in induction type power supply system according to claim 1, wherein in the step of marking the start bit flag as confirmation completed in step (m), the trigger signal timer is cleared to zero and restarted for detecting next trigger, and the timers installed in the supplying-end and receiving-end modules are calibrated at the same time.

6. A method of time-synchronized data transmission in induction type power supply system to achieve transmission of data signals and power between a supplying-end module used to transmit power and a receiving-end module used to feed back data signals, the method comprising the steps of:
- (a1) initializing the data signal receiving program in the supplying-end module and setting the values of main timing loop and other items following transmission of power from the supplying-end module;
- (b1) starting and transmitting the main timing loop of data transmission and performing programmed operations at a scheduled time;
- (c1) performing initialization of the transmission power pre-reduction check and control program within 3mS before a timer of the main timing loop of transmission is cleared to zero;
- (d1) checking trigger signal that indicates a first trigger range of a start signal; if a trigger signal is found within 2.5 mS±0.5 mS prior to zero clearing of the timer for the main timing loop of transmission, proceeding to step (e1); otherwise, proceeding to step (f1);
- (e1) marking signal check flag as a transmitted trigger signal, starting the trigger signal timer to prepare for the next trigger and proceeding to step (f1);
- (f1) performing initialization of a transmission power recovery check and control program within 2 mS prior to zero clearing of the timer for the main timing loop of transmission;
- (g1) performing initialization of the transmission power pre-reduction check and control program within 0.5 mS prior to zero clearing of the timer for the main timing loop of transmission;
- (h1) checking the trigger signal that indicates a second trigger range of the start signal; if a bit length is found to be in inconformity with the set range within ±0.5 mS prior to zero clearing of the timer for the main timing loop of transmission, proceeding to step (i1); if both triggers are completed and the length range is satisfied, proceeding to step (m1);
- (i1) recording a failed transmission if the supplying-end microprocessor does not correctly receive two triggers whose bit lengths comply with the set range, shutting off a voltage comparator used for detecting the trigger signal, executing the transmission power recovery check and control program, and resetting the timing when the main timing loop returns to zero;
- (j1) deciding if a number of failed transmission is greater than a set upper limit value; proceeding to step (k1) if the upper limit value is reached; otherwise, proceeding to step (b1);
- (k1) if no trigger signal is received within a expected time period, deciding that data transmission is failed, getting ready to terminate output from the supplying-end coil and entering into a standby mode;
- (m1) if two triggers of the start bit fall within the set range, deciding that the start bit signal is fed from the receiving-end module correctly, clearing the timer for the main timing loop again and restarting the timer to synchronize the timer in the supplying-end microprocessor with the timer for the main loop of data transmission in the receiving-end microprocessor;

(n1) starting to receive data bits, and after the timer for receiving data bits is cleared to zero, restarting the supplying-end microprocessor;

(o1) checking signal flag that indicates completion of receiving to decide if a check is needed; proceeding to step (o11) if check is needed; otherwise, proceeding to step (p1);

(o11) performing initialization of the transmission power pre-reduction check and control program when timer for detection of data bit receiving runs for 2.25 mS in the supplying-end microprocessor;

(o12) checking the trigger signal and deciding that the data length of the end bit signal received is 2.5 mS±0.5 mS;

(o13) executing the transmission power recovery check and control program when the timer for detection of data bit receiving runs for 2.75 mS in the supplying-end microprocessor;

(o14) transmission being completed, transferring the data into the supplying-end microprocessor for internal use and preparing to receive data in the next data transmission loop, and then proceeding to step (b1);

(o15) deciding that data transmission is failed if no triggering happened within the expected time period, executing the transmission power recovery check and control program, and proceeding to step (ji);

(p1) performing initialization of the transmission power pre-reduction check and control program when the timer for detection of data bit receiving runs for 1.75 mS in the supplying-end microprocessor;

(q1) checking the trigger signal; if the triggering happened within 2 mS±0.5 mS, deciding that the data length of logic 0 signal received is 2 mS and proceeding to step (qi1); if no triggering happened, proceeding to step (r1);

(q11) clearing the timer for detection of data bit receiving to zero at the triggering point and restarting it, then marking the received data signal as logic 0;

(q12) executing the transmission power recovery check and control program when the timer for detection of data bit receiving runs for 0.25 mS in the supplying-end microprocessor;

(q13) storing the received logic bits into (Rx) data buffer cyclically in sequence from the most significant bit to the least significant bit, and adding one count to data counter;

(q14) checking if a number of data transmission has been equal to that of transmitted data bits; if yes, proceeding to step (q15); otherwise, proceeding to step (q16);

(q15) having received incomplete data bit, and preparing to receive the trigger next time, and proceeding to step (c1);

(q16) the supplying-end microprocessor having received a complete data bit, marking an end bit flag that needs to be checked, preparing to receive the next trigger and proceeding to step (c1);

(r1) executing the transmission power recovery check and control program when the timer for detection of data bit receiving runs for 2.25 mS in the supplying-end microprocessor;

(s1) executing the transmission power recovery check and control program when the timer for detection of data bit receiving runs for 2.75 mS in the supplying-end microprocessor;

(t1) checking the trigger signal, deciding that the data length of the logic 1 bit signal received is 3 mS±0.5 mS, and proceeding to step (u1); proceeding to step (o15) if the triggering does not happen;

(u1) clearing the timer for detection of data bit receiving to zero and restarting the supplying-end microprocessor, and then marking the received data as logic 1;

(v1) executing the transmission power recovery check and control program when the timer for detection of data bit receiving runs for 0.25 mS in the supplying-end microprocessor and proceed to step (q12) continuously.

7. The method of time-synchronized data transmission in induction type power supply system according to claim 6, wherein the transmission power pre-reduction check and control program in step (c1) comprises the steps of:

(c11) initializing the transmission power pre-reduction check and control program;

(c12) checking if the testing voltage on the supplying-end coil of the supplying-end module has reached the set value to pre-reduce the output power; if the set value has not been reached, proceeding to step (c13); otherwise, proceeding to step (c15);

(c13) starting the voltage comparator in the supplying-end microprocessor and preparing to detect the trigger signal;

(c14) terminating the transmission power pre-reduction check and control program and returning to the master system program;

(c5) recording a current operating frequency first, and then increasing output frequency to the power drive unit to reduce the output frequency from the supplying-end coil when a set value range for power pre-reduction is reached;

(c16) starting the voltage comparator in the supplying-end microprocessor to prepare for detecting the trigger signal, setting a marking for reduced power and proceeding to step (c14).

8. The method of time-synchronized data transmission in induction type power supply system according to claim 6, wherein the transmission power recovery check and control program in step (f1) comprises the steps of:

(f11) initializing the transmission power recovery check and control program;

(f12) checking if there is any marking made for power pre-reduction; if there is no marking, proceeding to step (f13); otherwise, proceeding to step (f15);

(f13) no marking made for power pre-reduction, shutting off the voltage comparator in the supplying-end microprocessor directly to make it unable to be triggered within the time period and prevent from interfering with data transmission when no data is received;

(f14) terminating the transmission power recovery check and control program and returning to master system program;

(f15) restoring to an operating frequency recorded previously to make output frequency to a power drive unit and amplitudes of the output frequency from the supplying-end coil return to a signal state prior to power pre-reduction;

(f16) shutting off the voltage comparator in the supplying-end microprocessor to prevent noise and system error, eliminating markings for power pre-reduction and proceeding to step (f14).

9. The method of time-synchronized data transmission in induction type power supply system according to claim 6, wherein in the step of marking the start bit flag as confirmation completed in step (m1), the trigger signal timer is cleared to zero and restarted for detecting next trigger, and the timers installed in the supplying-end and receiving-end modules are calibrated at the same time.

* * * * *